(12) United States Patent
Wang et al.

(10) Patent No.: US 10,771,323 B2
(45) Date of Patent: Sep. 8, 2020

(54) ALARM INFORMATION PROCESSING METHOD, RELATED DEVICE, AND SYSTEM

(71) Applicant: Huawei Technologies Co., Ltd., Shenzhen (CN)

(72) Inventors: Shanshan Wang, Shanghai (CN); Bingli Zhi, Shanghai (CN); Jian Zhu, Shenzhen (CN); Wenyong Han, Shenzhen (CN); Lan Zou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 26 days.

(21) Appl. No.: 15/675,105

(22) Filed: Aug. 11, 2017

(65) Prior Publication Data

US 2017/0339007 A1 Nov. 23, 2017

Related U.S. Application Data

(63) Continuation of application No. PCT/CN2015/075796, filed on Apr. 2, 2015.

(30) Foreign Application Priority Data

Feb. 12, 2015 (WO) ................ PCT/CN2015/072910

(51) Int. Cl.
*H04L 12/24* (2006.01)
*H04L 12/46* (2006.01)

(52) U.S. Cl.
CPC ...... *H04L 41/0695* (2013.01); *H04L 12/4641* (2013.01); *H04L 41/00* (2013.01); *H04L 41/065* (2013.01); *H04L 41/0645* (2013.01)

(58) Field of Classification Search
None
See application file for complete search history.

(56) References Cited

U.S. PATENT DOCUMENTS 7,142,654 B2    11/2006  Kang
7,203,881 B1 *   4/2007  Williams ............ G06F 11/0709
                                                  714/741
(Continued)

FOREIGN PATENT DOCUMENTS

CN      101202676 A    6/2008
CN      101316187 A   12/2008
(Continued)

OTHER PUBLICATIONS

"Network Function Virtualisation (NFV); Management and Orchestration; Vi-Vfnm Reference Point—Interface and Informational Model Specification," GS NFV IFA008, V0.1.0, pp. 1-11, European Telecommunications Standards Institute, Sophia Antipolis Cedex, France (Jan. 2015).

(Continued)

*Primary Examiner* — Rebecca E Song
(74) *Attorney, Agent, or Firm* — Leydig, Voit & Mayer, Ltd.

(57) ABSTRACT

Embodiments of the present invention disclose an alarm information processing method, including: acquiring, by an EMS, a first alarm information set reported by a VNFM, where the first alarm information set is generated after the VNFM performs correlation analysis on at least one piece of NFVI alarm information and at least one piece of VIM alarm information; acquiring, by the EMS, a second alarm information set reported by a VNF, where the second alarm information set includes at least one piece of VNF alarm information; and performing, by the EMS, correlation analysis on the first alarm information set and the second alarm information set, and dispatching a configured work order for alarm information that has a correlation relationship. By using the present invention, a cross-layer association (Continued)

between alarm information can be implemented to reduce a quantity of work orders.

20 Claims, 9 Drawing Sheets

(56) References Cited

U.S. PATENT DOCUMENTS

| | | | |
|---|---|---|---|
| 8,175,863 | B1 | 5/2012 | Ostermeyer et al. |
| 2004/0193943 | A1 | 9/2004 | Angelino et al. |
| 2004/0210623 | A1 | 10/2004 | Hydrie et al. |
| 2006/0031473 | A1 | 2/2006 | Wood |
| 2016/0103698 | A1 | 4/2016 | Yang et al. |
| 2016/0170848 | A1* | 6/2016 | Yang ............... G06F 11/2023 714/4.12 |
| 2017/0317872 | A1* | 11/2017 | Zhu .................. H04L 41/065 |
| 2017/0346676 | A1* | 11/2017 | Andrianov .......... H04L 41/0631 |

FOREIGN PATENT DOCUMENTS

| | | |
|---|---|---|
| CN | 101414933 A | 4/2009 |
| CN | 101582807 A | 11/2009 |
| CN | 1992636 B | 4/2010 |
| CN | 101128001 B | 12/2010 |
| CN | 103718512 A | 4/2014 |
| CN | 104125087 A | 10/2014 |
| CN | 104170323 A | 11/2014 |
| CN | 104243232 A | 12/2014 |
| EP | 2672668 A1 | 12/2013 |
| EP | 3119034 A1 | 1/2017 |
| JP | 2006025434 A | 1/2006 |
| RU | 2357278 C2 | 5/2009 |
| RU | 2382398 C2 | 2/2010 |
| WO | 03075206 A2 | 9/2003 |
| WO | 2013055538 A1 | 4/2013 |
| WO | 2016093861 A1 | 6/2016 |

OTHER PUBLICATIONS

"Network Function Virtualisation (NFV); Management and Orchestration; Vi-Vnfm Reference Point—Interface and Informational Model Specification," Draft ETSI GS NFV-IFA 006, V0.0.1, pp. 1-14, European Telecommunications Standards Institute, Sophia Antipolis Cedex, France (Dec. 2014).

"Network Functions Virtualisation (NFV); Management and Orchestration," ETSi GS NFV-MAN 001 V1.1.1, pp. 1-184, The European Telecommunications Standards Institute, Sophia Antipolis, France (Dec. 2014).

* cited by examiner

US 10,771,323 B2

ALARM INFORMATION PROCESSING METHOD, RELATED DEVICE, AND SYSTEM

CROSS-REFERENCE TO RELATED APPLICATIONS

This application is a continuation of International Application No. PCT/CN2015/075796, filed on Apr. 2, 2015, which claims priority to International Application No. PCT/CN2015/072910, filed on Feb. 12, 2015. The disclosures of the aforementioned applications are hereby incorporated by reference in their entireties.

TECHNICAL FIELD

Embodiments of the present invention relate to the communications field, and in particular, to an alarm information processing method, a related device, and a system.

BACKGROUND

In an application scenario of an NFV (network function virtualization) system, a traditional network and an architecture of network nodes change significantly. For a traditional physical telecommunications node in a new network architecture, a physical node evolves into a virtual node. A network architecture defined in an NFV system standard introduces function nodes such as an NFVI (network functions virtualization infrastructure), a VIM (virtualized infrastructure manager), a VNFM (virtualized network function manager), and an NFVO (network functions virtualization orchestrator).

A virtualization layer and a service layer are introduced to the NFV system, and each application VNF runs on the NFVI. According to a layered design, an EMS (Element Management System) monitors alarm information of network elements at the service layer and the virtualization layer separately. The network element may be a generic term for a physical object at the virtualization layer or a virtual object at the service layer. For example, the physical object includes a memory, a hard disk, a link, a board, a CPU, and a network interface card, and the virtual object includes a virtual machine, a virtual network interface card, and an application program.

In current troubleshooting, the EMS monitors alarm information at a single layer, and cannot determine a fault from a perspective of an entire network. The EMS dispatches multiple work orders for alarm information of a same root cause to maintenance personnel. In this way, monitoring personnel need to spend a large amount of time in analyzing a fault, dispatching a work order, and tracking a work order. In addition, the maintenance personnel also need to process a large quantity of work orders. Costs of operation and maintenance increase substantially.

SUMMARY

A technical problem to be resolved in embodiments of the present invention is providing an alarm information processing method, a related device, and a system, which can resolve a problem of high costs of operation and maintenance in the conventional art.

To resolve the foregoing technical problem, a first aspect of the embodiments of the present invention provides an alarm information processing method, including:

receiving, by an element management system EMS, a first alarm message reported by a virtualized network function manager VNFM, where the first alarm message includes first alarm association information, and the first alarm association information includes at least one of the following: a first object identity and a preset association between object identities;

receiving, by the EMS, a second alarm message reported by a virtualized network function VNF, where the second alarm message includes second alarm association information, and the second alarm association information includes at least one of the following: a second object identity and the preset association between object identities; and performing, by the EMS, correlation analysis on the first alarm message and the second alarm message according to the first alarm association information and the second alarm association information.

With reference to the first aspect, in a first implementation manner of the first aspect, the first object identity includes at least one of the following: a VNF identity, a virtual machine VM identity, and a virtual transmission resource identity of a VM;

the second object identity includes at least one of the following: a VNF identity, a VM identity, and a virtual transmission resource identity of a VM; and the preset association between object identities is used to indicate an association between different object identities; where the VNF identity includes a VNF identifier ID or a VNF name, the VM identity includes a VM ID or a VM name, and the virtual transmission resource identity includes a virtual transmission resource ID or a virtual transmission resource name.

With reference to the first aspect or the first implementation manner of the first aspect, in a second implementation manner of the first aspect, the first alarm message further includes a first alarm information set, and the first alarm information set includes at least one of the following: NFVI alarm information, VM alarm information, and VNFM alarm information.

With reference to the first aspect or the first or the second implementation manner of the first aspect, in a third implementation manner of the first aspect, the second alarm message further includes a second alarm information set, and the second alarm information set includes at least one piece of VNF alarm information.

With reference to the first aspect, or any one of the first to the third implementation manners of the first aspect, in a fourth implementation manner of the first aspect, when the first alarm message includes the first alarm information set, and the second alarm information includes the second alarm information set, the performing, by the EMS, correlation analysis on the first alarm message and the second alarm message according to the first alarm association information and the second alarm association information includes:

acquiring, from the first alarm information set and the second alarm information set according to the first alarm association information and the second alarm association information, alarm information that has same alarm association information, and performing, according to a preset correlation rule, correlation analysis on the acquired alarm information that has the same alarm association information; or acquiring a third alarm information set from the first alarm information set and the second alarm information set according to the preset association between object identities, the first object identity, and the second object identity, where the third alarm information set includes alarm information in which object identities are associated; and performing correlation analysis on the third alarm information set according to a preset correlation rule.

A second aspect of the embodiments of the present invention provides an alarm information processing method, including:

receiving, by a virtualized network function manager VNFM, virtual machine VM alarm information reported by a virtualized infrastructure manager VIM, where the VM alarm information includes a third object identity;

generating, by the VNFM, a first alarm message according to the VM alarm information, where the first alarm message includes first alarm association information, and the first alarm association information includes at least one of the following: a first object identity and a preset association between object identities; and sending, by the VNFM, the first alarm message to an element management system EMS, so that the EMS performs correlation analysis on the first alarm message and second alarm message that is reported by a VNF.

With reference to the second aspect, in a first implementation manner of the second aspect, the third object identity includes at least one of the following: a VM identity, a host HOST identity at an NFVI infrastructure layer, and a virtual transmission resource identity of a VM; where the VM identity includes a VM identifier ID or a VM name, the HOST identity includes a HOST ID or a HOST name, and the virtual transmission resource identity of a VM includes a virtual transmission resource ID or a virtual transmission resource name.

With reference to the second aspect or the first implementation manner of the second aspect, in a second implementation manner of the second aspect, the first object identity includes at least one of the following: a VNF identity, a VM identity, and a virtual transmission resource identity of a VM; and the preset association between object identities is used to indicate an association between different object identities.

With reference to the second aspect or the first or the second implementation manner of the second aspect, in a third implementation manner of the second aspect, the first alarm message further includes first alarm information set, and the first alarm information set includes at least one of the following: NFVI alarm information, VM alarm information, and VNFM alarm information.

With reference to the second aspect or any one of the foregoing implementation manners of the second aspect, in a fourth implementation manner of the second aspect, the generating, by the VNFM, a first alarm message according to the VM alarm information includes:

obtaining, according to a preset correspondence between the third object identity and a VNF identity and the third object identity in the VM alarm information, a VNF identity corresponding to the third object identity, and using the obtained VNF identity as the first object identity to generate the first alarm message; or performing correlation analysis on the VM alarm information to generate the first alarm message.

A third aspect of the embodiments of the present invention provides an alarm information processing method, including:

performing, by a virtualized infrastructure manager VIM, correlation analysis on at least two pieces of alarm information to generate virtual machine VM alarm information; and reporting the generated VM alarm information to a virtualized network function manager VNFM, so that the VNFM reports, according to the VM alarm information, a first alarm message to an element management system EMS, where the EMS performs correlation analysis on the first alarm message and second alarm message that is reported by a VNF.

With reference to the third aspect, in a first implementation manner of the third aspect, the at least two pieces of alarm information includes:

at least one piece of network functions virtualization infrastructure NFVI alarm information and at least one piece of VM alarm information; or at least two pieces of NFVI alarm information; or at least two pieces of VM alarm information.

With reference to the third aspect or the first implementation manner of the third aspect, in a second implementation manner of the third aspect, the method further includes:

receiving NFVI alarm information reported by an NFVI, where the NFVI alarm information includes an NFVI identity;

the performing, by a VIM, correlation analysis on at least two pieces of alarm information to generate virtual machine VM alarm information includes:

performing correlation analysis on the NFVI alarm information to generate the VM alarm information; where the NFVI identity includes at least one of a VM identity, a host HOST identity, and a virtual transmission resource identity of a virtual machine, the VM identity includes a VM identifier ID or a VM name, the HOST identity includes a HOST ID or a HOST name, and the virtual transmission resource identity of a VM includes a virtual transmission resource ID or a virtual transmission resource name.

A fourth aspect of the embodiments of the present invention provides an alarm information processing apparatus, and the apparatus is an element management system EMS and includes:

a first receiving unit, configured to receive a first alarm message reported by a virtualized network function manager VNFM, where the first alarm message includes first alarm association information, and the first alarm association information includes at least one of the following: a first object identity and a preset association between object identities;

a second receiving unit, configured to receive a second alarm message reported by a virtualized network function VNF, where the second alarm message includes second alarm association information, and the second alarm association information includes at least one of the following: a second object identity and the preset association between object identities; and a processing unit, configured to perform, according to the first alarm association information and the second alarm association information, correlation analysis on the first alarm message received by the first receiving unit and the second alarm message received by the second receiving unit.

With reference to the fourth aspect, in a first implementation manner of the fourth aspect, the first object identity includes at least one of the following: a VNF identity, a virtual machine VM identity, and a virtual transmission resource identity of a VM;

the second object identity includes at least one of the following: a VNF identity, a VM identity, and a virtual transmission resource identity of a VM; and the preset association between object identities is used to indicate an association between different object identities; where the VNF identity includes a VNF identifier ID or a VNF name, the VM identity includes a VM ID or a VM name, and the virtual transmission resource identity includes a virtual transmission resource ID or a virtual transmission resource name.

With reference to the fourth aspect or the first implementation manner of the fourth aspect, in a second implementation manner of the fourth aspect, the first alarm message further includes a first alarm information set, and the first alarm information set includes at least one of the following: NFVI alarm information, VM alarm information, and VNFM alarm information.

With reference to the fourth aspect or the first or the second implementation manner of the fourth aspect, in a third implementation manner of the fourth aspect, the second alarm message further includes a second alarm information set, and the second alarm information set includes at least one piece of VNF alarm information.

With reference to the fourth aspect or any one of the foregoing implementation manners of the fourth aspect, in a fourth implementation manner of the fourth aspect, when the first alarm message includes the first alarm information set, and the second alarm information includes the second alarm information set, the processing unit is specifically configured to:

acquire, from the first alarm information set and the second alarm information set according to the first alarm association information and the second alarm association information, alarm information that has same alarm association information, and perform, according to a preset correlation rule, correlation analysis on the acquired alarm information that has the same alarm association information; or acquire a third alarm information set from the first alarm information set and the second alarm information set according to the preset association between object identities, the first object identity, and the second object identity, where the third alarm information set includes alarm information in which object identities are associated; and perform correlation analysis on the third alarm information set according to a preset correlation rule.

A fifth aspect of the embodiments of the present invention provides an alarm information processing apparatus, and the apparatus is a virtualized network function manager VNFM and includes:

a receiving unit, configured to receive virtual machine VM alarm information reported by a virtualized infrastructure manager VIM, where the VM alarm information includes a third object identity;

a processing unit, configured to generate a first alarm message according to the VM alarm information received by the receiving unit, where the first alarm message includes first alarm association information, and the first alarm association information includes at least one of the following: a first object identity and a preset association between object identities; and a sending unit, configured to send the first alarm message generated by the processing unit to an element management system EMS, so that the EMS performs correlation analysis on the first alarm message and second alarm message that is reported by a VNF.

With reference to the fifth aspect, in a first implementation manner of the fifth aspect, the third object identity includes at least one of the following: a VM identity, a host HOST identity at an NFVI infrastructure layer, and a virtual transmission resource identity of a VM; where the VM identity includes a VM identifier ID or a VM name, the HOST identity includes a HOST ID or a HOST name, and the virtual transmission resource identity of a VM includes a virtual transmission resource ID or a virtual transmission resource name.

With reference to the fifth aspect or the first implementation manner of the fifth aspect, in a second implementation manner of the fifth aspect, the first object identity is used to uniquely identify a first object and the first object identity includes at least one of the following: a VNF identity, a VM identity, and a virtual transmission resource identity of a VM; and the preset association between object identities is used to indicate an association between different object identities.

With reference to the fifth aspect or the first or the second implementation manner of the fifth aspect, in a third implementation manner of the fifth aspect, the first alarm message further includes first alarm information set, and the first alarm information set includes at least one of the following: NFVI alarm information, VM alarm information, and VNFM alarm information.

With reference to the fifth aspect or any one of the foregoing implementation manners of the fifth aspect, in a fourth implementation manner of the fifth aspect, the processing unit is specifically configured to:

obtain, according to a preset correspondence between the third object identity and a VNF identity and the third object identity in the VM alarm information, a VNF identity corresponding to the third object identity, use the obtained VNF identity as the first object identity, and generate the first alarm message according to the first object identity; or perform correlation analysis on the VM alarm information to generate the first alarm message.

A sixth aspect of the embodiments of the present invention provides an alarm information processing apparatus, and the apparatus is a virtualized infrastructure manager VIM and includes:

a processing unit, configured to perform correlation analysis on at least two pieces of alarm information to generate virtual machine VM alarm information; and a sending unit, configured to report the VM alarm information generated by the processing unit to a virtualized network function manager VNFM, so that the VNFM reports, according to the VM alarm information, a first alarm message to an element management system EMS, where the EMS performs correlation analysis on the first alarm message and second alarm message that is reported by a VNF.

With reference to the sixth aspect, in a first implementation manner of the sixth aspect, the at least two pieces of alarm information includes:

at least one piece of network functions virtualization infrastructure NFVI alarm information and at least one piece of VM alarm information; or at least two pieces of NFVI alarm information; or at least two pieces of VM alarm information.

With reference to the sixth aspect or the first implementation manner of the sixth aspect, in a second implementation manner of the sixth aspect, the apparatus further includes:

a receiving unit, configured to receive NFVI alarm information reported by an NFVI, where the NFVI alarm information includes an NFVI identity; and the processing unit, configured to perform correlation analysis on the NFVI alarm information received by the receiving unit, so as to generate the VM alarm information; where the NFVI identity includes at least one of a VM identity, a host HOST identity, and a virtual transmission resource identity of a virtual machine, the VM identity includes a VM identifier ID or a VM name, the HOST identity includes a HOST ID or a HOST name, and the virtual transmission resource identity of a VM includes a virtual transmission resource ID or a virtual transmission resource name.

The following beneficial effects are brought by implementing the embodiments of the present invention:

Based on an association, correlation analysis may be performed on alarm information at different layers, alarm information that has a correlation relationship at different layers may be determined, a cross-layer association between alarm information may be implemented, and a same work order may be dispatched for alarm information of a same root cause, thereby reducing a quantity of dispatched work orders and reducing costs of operation and maintenance of a network.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
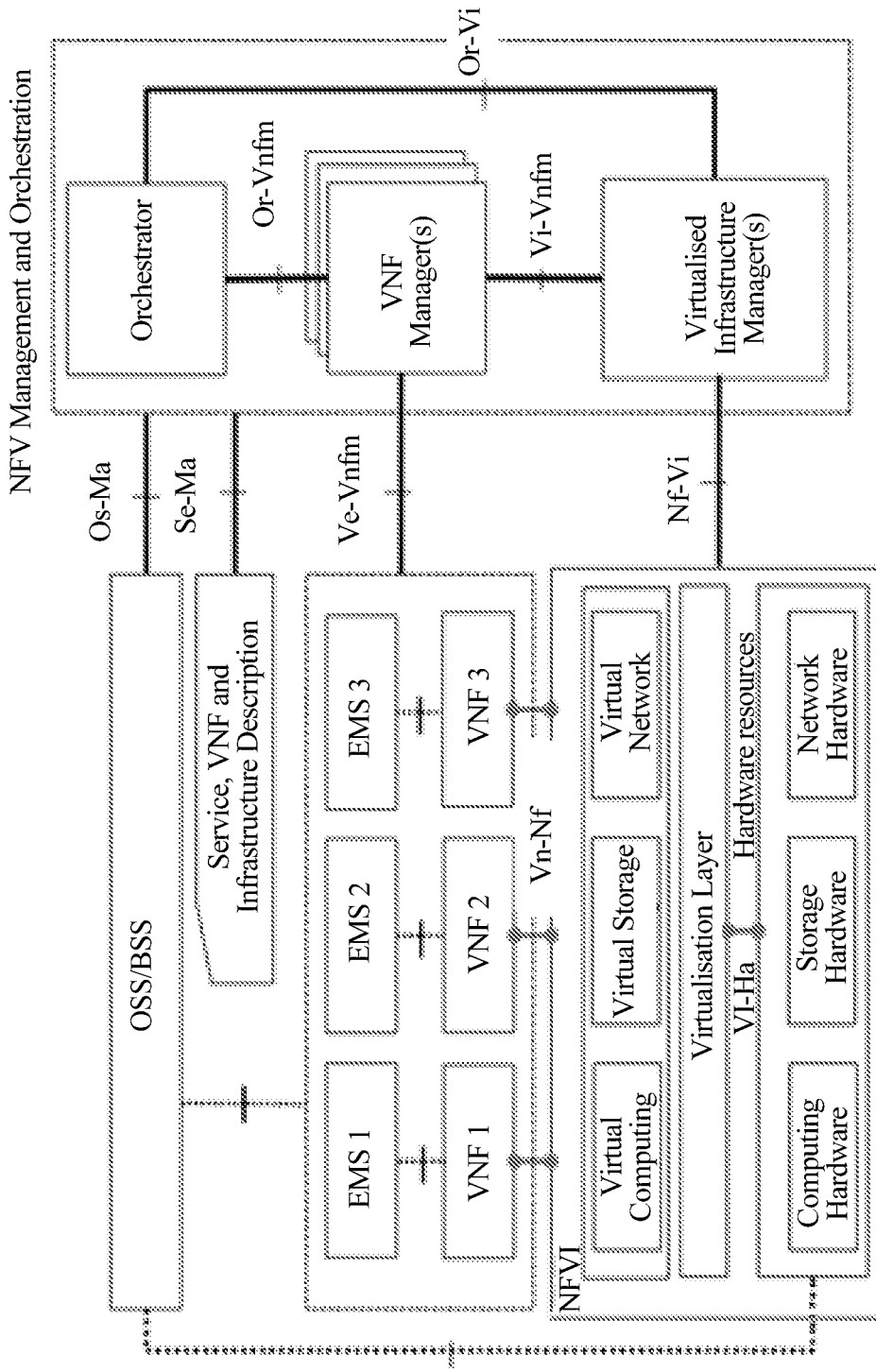
FIG. 1 is a schematic structural diagram of an NFV system according to an embodiment of the present invention.

Referring to FIG. 1, FIG. 1 is a diagram of a network architecture of an embodiment of the present invention. Technical solutions of this embodiment of the present invention are applied to an NFV system, and the NFV system of this embodiment of the present invention includes function nodes such as a network functions virtualization infrastructure (NFVI for short), a VIM, a VNF, an EMS, a VNFM, and an NFVO.

The VNF is corresponding to a physical network function (PNF) entity in a traditional non-virtualized network. A functional behavior and state of a network function is irrelevant to whether virtualization is implemented. In this embodiment of the present invention, the VNF and the PNF have same functional behaviors and same external interfaces.

The EMS is used to monitor alarm information of multiple network elements at a service layer and a virtualization layer in the NFV system.

The VIM is a virtualized entity used to control and manage computation, storage, and network resources.

The NFVO is a virtualized entity responsible for performing network-side orchestration and management on an NFV resource, and realizing NFV service topology on an NFV infrastructure.

The NFVI includes a hardware resource, a virtual resource, and a virtualization layer. From a perspective of the VNF, the virtualization layer and the hardware resource may be considered as an entity that can provide a required virtual resource. A management control unit of the NFVI is responsible for management and control of a virtual machine VM in the NFVI.

The VNFM is responsible for lifecycle management of the VNF.

Interfaces used in the NFV system in this embodiment includes:
1. A VI-Ha interface between the virtualization layer and the hardware resource, where the hardware resource may be requested and related hardware resource status information may be collected by using the VI-Ha interface;
2. A Vn-Nf interface that is between the VNF and the NFVI and is configured to describe an execution environment provided by the NFVI for the VNF;
3. An Or-VnFm interface that is between the NFVO and the VNFM and is an internal interface of a MANO, where the MANO includes the NFVO, the VNFM, and the VIM, and the Or-Vnfm interface is specifically used by the NFVO to:
send a resource-related request to the VNFM, for example, a request for authorization, authentication, reservation, allocation, or the like of a resource, for the lifecycle management of the VNF;
send configuration information to the VNFM, so that the VNF can be properly configured according to a VNF forwarding graph; and
collect status information (for example, fault information) of the VNF for the lifecycle management of the VNF;
4. A Vi-Vnfm interface that is between the VIM and the VNFM and is an internal interface of the MANO, where the Vi-Vnfm interface is specifically used by the VNFM to send a resource configuration request; and
to configure a virtual hardware resource and exchange status information;
5. An Or-Vi interface that is between the NFVO and the VIM and is an internal interface of the NFVO, where the Or-Vi interface is specifically used by the NFVO to send a resource reservation request; by the NFVO to send a resource allocation request; and to configure a virtual hardware resource and exchange status information;
6. An Nf-Vi interface that is between the NFVI and the VIM and specifically used to:
allocate specific resource according to a resource allocation request; forward virtual-resource status information; and configure a virtual hardware resource and exchange status information;
7. An Os-Ma interface that is between an OSS/BSS and the NFVO and is specifically configured to:
request lifecycle management of a service graph; request the lifecycle management of the VNF; forward NFV-related status information; exchange policy management information; exchange data analysis information; forward NFV-related charging and usage records; and exchange capacity and inventory information;
8. A Ve-Vnfm interface that is between the VNF/EMS and the VNFM and is specifically used to:
request the lifecycle management of the VNF; exchange configuration information; and exchange status information necessary for performing lifecycle management;
9. A Se-Ma interface that is between a Service, VNF and Infrastructure Description and the NFVO and is used to retrieve information related to the VNF forwarding graph, service-related information, VNF-related information, and information related to an NFVI information model, where the information is provided to the NFVO for use.

In this embodiment of the present invention, association analysis is performed on alarm information at a service layer and alarm information at an infrastructure layer and a virtualization layer, so as to reduce the amount of alarm information; cross-layer alarm information analysis is implemented and a same work order is dispatched for alarm information of a same root cause to reduce a quantity of dispatched work orders, thereby reducing costs of operation and maintenance of a network.

Figure 2:
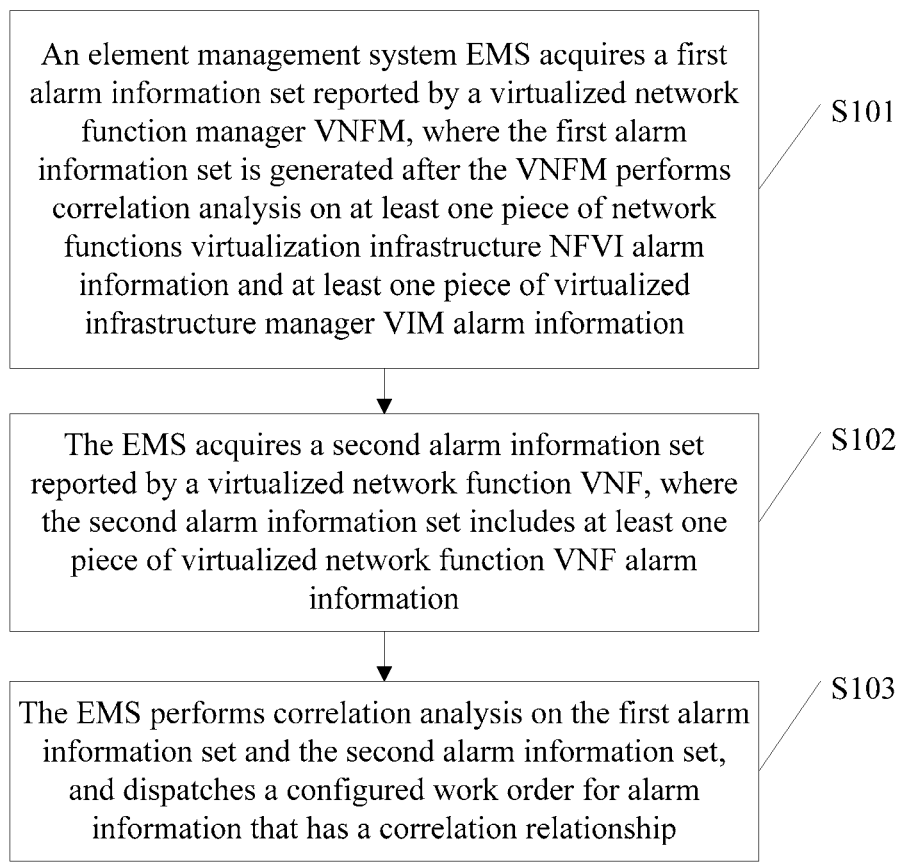
FIG. 2 is a schematic flowchart of an alarm information processing method according to an embodiment of the present invention.

Referring to FIG. 2, FIG. 2 shows an alarm information processing method according to an embodiment of the present invention. In this embodiment of the present invention, the method includes the following steps:

S101. An element management system EMS acquires a first alarm information set reported by a virtualized network function manager VNFM, where the first alarm information set is generated after the VNFM performs correlation analysis on at least one piece of network functions virtualization infrastructure NFVI alarm information and at least one piece of virtualized infrastructure manager VIM alarm information.

Specifically, an NFVI is divided into an infrastructure layer and a virtualization layer. The infrastructure layer and the virtualization layer include different managed objects. For example, the infrastructure layer includes managed objects such as a physical host, a memory, a switch, a physical network interface card, and a physical port, and the virtualization layer includes managed objects such as a virtual machine, a virtual network interface card, and a virtual port. When a managed object in the NFVI is faulty, the NFVI reports at least one piece of NFVI alarm information to a VIM, and the alarm information carries parameters such as a managed object identity, alarm time, and an alarm severity. The VIM is responsible for managing the NFVI. When the NFVI is faulty, the VIM is also faulty and generates VIM alarm information. The VIM reports the at least one piece of NFVI alarm information and the at least one piece of VIM alarm information to the VNFM. The VNFM performs correlation analysis on the at least one piece of NFVI alarm information and the at least one piece of VIM alarm information.

The VNFM may perform correlation analysis on the at least one piece of NFVI alarm information and the at least one piece of VIM alarm information according to a correlation rule, so as to determine alarm information that has a correlation and group together the alarm information that has the correlation. The VNFM may also shield the at least one piece of NFVI alarm information and the at least one piece of VIM alarm information, so as to reduce the amount of alarm information. After the foregoing processing, the first alarm information set is generated, and the VNFM reports the first alarm information set to the EMS, where the first alarm information set may be represented in a form of a fault tree.

S102. The EMS acquires a second alarm information set reported by a virtualized network function VNF, where the second alarm information set includes at least one piece of virtualized network function VNF alarm information.

Specifically, when the VNF detects a fault in the VNF, multiple pieces of VNF alarm information are generated, where the second alarm set includes the multiple pieces of alarm information, and the VNF reports the second alarm information set to the EMS.

S103. The EMS performs correlation analysis on the first alarm information set and the second alarm information set, and dispatches a configured work order for alarm information that has a correlation relationship.

Specifically, the EMS performs correlation analysis on alarm information in the first alarm information set and alarm information in the second alarm set. The alarm information in the first alarm information set includes alarm information generated at the infrastructure layer and the virtualization layer. The alarm information in the second alarm information set includes alarm information at a service layer. The EMS may perform correlation analysis on the alarm information in the first alarm information set and the alarm information in the second alarm information set according to the preset correlation rule, and dispatch the configured work order for the alarm information that has the correlation relationship. In this way, correlation analysis is performed on alarm information at multiple layers and the work order is dispatched for the alarm information that has the correlation relationship, thereby reducing a quantity of work orders.

Optionally, that the EMS performs correlation analysis on the first alarm information set and the second alarm information set, and dispatches a configured work order for alarm information that has a correlation relationship includes:
    extracting a managed object identity that is carried in alarm information in the first alarm information set;
    querying, in the first alarm information set and the second alarm information set and based on an association between managed object identities, the alarm information that has the correlation relationship; and
    dispatching the configured work order for the alarm information that has the correlation relationship.

Specifically, different managed objects are distributed at the infrastructure layer, the virtualization layer, and the service layer, where the service layer serves as a top layer, the virtualization layer serves as a medium layer, and the infrastructure layer serves as a bottom layer. A managed object at one layer has a specific correspondence with that at another layer. When a managed object at the infrastructure layer is faulty, corresponding managed objects at the virtualization layer and the service layer are also faulty. When managed objects at all layers are faulty, managed object identities are carried in alarm information. Managed object identities of the managed objects that have such correspondences are bounded together in advance to form an association. For example, Application 1 at the service layer, VM 1 at the virtualization layer, and Host 1 at the infrastructure layer have an association, so that an identity of Application 1, an identity of VM 1, and an identity of Host 1 are bound together to form an association.

The EMS extracts the managed object identity that is carried in the alarm information in the first alarm information set; queries, in the first alarm information set and the second alarm information set and based on the association, the alarm information that has the correlation relationship; and dispatches the configured work order for the alarm information that has the correlation relationship. For example, the first alarm information set includes alarm information 1, alarm information 2, alarm information 3, and alarm information 4, and the second alarm information set includes alarm information 5, alarm information 6, alarm information 7, and alarm information 8, where in the first alarm information set, alarm information 1 and alarm information 2 have a correlation relationship, and alarm information 3 and alarm information 4 have a correlation relationship. If a managed object identity that is carried in alarm information 1 and extracted by the EMS is an identity of VM 1, and it is found, according to an association "Application 1-VM 1-Host 1", that a managed object identity carried in alarm information 5 in the second alarm information set is an identity of Host 1, the EMS determines that alarm information 1, alarm information 2, and alarm information 5 have a correlation relationship, and the EMS analyzes a fault cause according to the foregoing three pieces of alarm information and dispatches a configured work order.

Optionally, before the acquiring, by an element management system EMS, a first alarm information set reported by a virtualized network function manager VNFM, the method further includes:
    configuring, by a MANO, the association, between managed object identities, for the VNF, where the managed object identity that is carried in the alarm information in the first alarm information set includes an identity of a VM or an identity of a vNIC, and the managed object identity that is carried in the alarm information in the second alarm information set includes an identity of the VNF.

Specifically, the MANO configures the association, between managed object identities, for the VNF, and the alarm information in the second alarm information set reported by the VNF to the EMS carries the association between managed object identities. Furthermore, the alarm information in the second alarm information set further carries a managed object identity of a faulty managed object, and the alarm information in the first alarm information set also carries a managed object identity of a faulty managed object. The EMS may query, in the first alarm information set and the second alarm information set according to the association between managed object identities that is carried in the alarm information in the second alarm set, the alarm information that has the correlation relationship. Managed object identities carried in the alarm information in the first alarm information set include, for example, a VM ID or a vNIC ID; the association between managed object identities that is carried in the alarm information in the second alarm information set is: VNF ID-VM ID-vNIC ID, where the association between managed object identities indicates an association between managed object identities that are at the service layer, the virtualization layer, and the infrastructure layer and that have a correspondence.

Optionally, the identity of a VM includes an identity allocated by the NFVI or an identity allocated by the MANO.

Optionally, the alarm information that is in the first alarm information set and the second alarm information set and has the correlation relationship are classified into a same group, a group identity is allocated to each group, and a corresponding alarm type identity is allocated to root alarm information and derivative alarm information in each group.

Specifically, the VNFM may classify, according to the preset correlation rule, the alarm information that is in the first alarm information set and has the correlation relationship into a same group, and a group identity is allocated to each group, where the correlation rule is classified into a time correlation rule and a space correlation rule. The VNFM determines a type, for example, a parent-child alarm or a brotherly alarm, of a correlation relationship according to the space correlation rule, determines the root alarm information and the derivative alarm information from the alarm information that has the correlation relationship, and allocates different alarm type identities separately. Likewise, the VNF may also perform the foregoing processing on the alarm information in the first alarm information set, and details are not described herein again.

It should be noted that the correlation rule may be used immediately after on-site activation, an operation of a client for summarizing a rule and testing on site is avoided, and a default correlation rule has been analyzed by experts and verified by tests and has high accuracy. The correlation rule may be enabled or disabled according to a requirement, or if the correlation rule includes several sub-rules, one or more of the sub-rules may be enabled or disabled according to a requirement.

By implementing this embodiment of the present invention, based on an association, correlation analysis may be performed on alarm information at different layers, alarm information at different layers that has a correlation relationship may be determined, a cross-layer association between alarm information may be implemented, and a same work order may be dispatched for alarm information of a same root cause, thereby reducing a quantity of dispatched work orders and reducing costs of operation and maintenance of a network.

Figure 3:
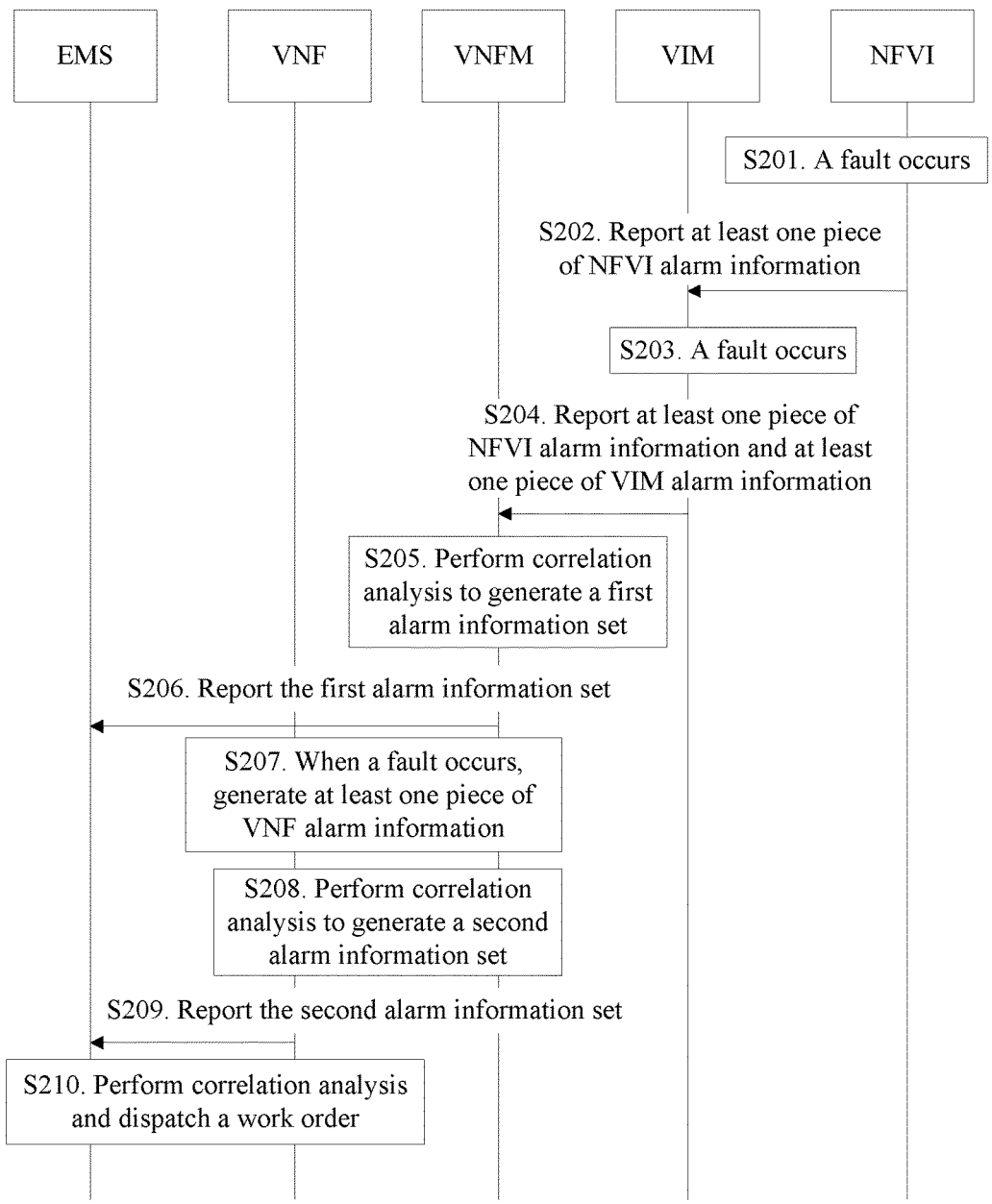
FIG. 3 is a schematic diagram of interaction in an alarm information processing system according to an embodiment of the present invention.

Referring to FIG. 3, FIG. 3 is a schematic diagram of interaction of an alarm information processing system according to an embodiment of the present invention. In this embodiment of the present invention, an involved functional entity includes: an EMS, a VNF, a VNFM, a VIM, and an NFVI, and a procedure of interaction between the foregoing functional entities is as follows:

S201. When the NFVI is faulty, the NFVI generates at least one piece of NFVI alarm information. Specifically, an NFVI is divided into an infrastructure layer and a virtualization layer. The infrastructure layer includes physical managed objects and the virtualization layer includes virtual managed objects. For example, the infrastructure layer includes managed objects such as a physical host, a memory, a switch, a physical network interface card, and a physical port, and the virtualization layer includes managed objects such as a virtual machine, a virtual network interface card, and a virtual port. When a managed object in the NFVI is faulty, the NFVI generates the at least one piece of NFVI alarm information, and the alarm information carries parameters such as a managed object identity, alarm time, and an alarm severity.

S202. The NFVI reports the at least one piece of NFVI alarm information to the VIM.

S203. When the VIM is faulty, the VIM generates at least one piece of VIM alarm information.

Specifically, when the NFVI is faulty, the VIM also generates alarm information according to status information and fault information of the VIM, and the alarm information carries parameters such as a managed object identity, alarm, and an alarm severity.

S204. The VIM reports at least one piece of NFVI alarm information and at least one piece of VIM alarm information to the VNFM.

S205. The VNFM performs correlation analysis on the at least one piece of NFVI alarm information and the at least one piece of VIM alarm information to generate a first alarm information set.

Specifically, the VNFM may perform correlation analysis on the at least one piece of NFVI alarm information and the at least one piece of VIM alarm information according to a correlation rule, so as to determine alarm information that has a correlation and group together the alarm information that has the correlation. The VNFM may also shield the at least one piece of NFVI alarm information and the at least one piece of VIM alarm information, so as to reduce the amount of alarm information. After the foregoing processing, the first alarm information set is generated, and the VNFM reports the first alarm information set to the EMS, where the first alarm information set may be represented in a form of a fault tree.

S206. The VNFM reports the first alarm information set to the EMS.

S207. When the VNF is faulty, the VNF generates at least one piece of VNF alarm information.

Specifically, a managed object in the NFVI and a managed object in the VNF have a correspondence, and when the managed object in the NFVI is faulty, the managed object in the VNF is also correspondingly faulty. When the VNF is faulty, the at least one piece of VNF alarm information is generated.

S208. The VNF performs correlation analysis on the at least one piece of VNF alarm information to generate a second alarm information set. Specifically, the VNF may classify, according to the preset correlation rule, the alarm information that is in the second alarm information set and has the correlation relationship into a same group, and a group identity is allocated to each group, where the correlation rule is classified into a time correlation rule and a space correlation rule. The VNF determines a type, for example, a parent-child alarm and a brotherly alarm, of a correlation relationship according to the space correlation rule, determines the root alarm information and the derivative alarm information from the alarm information that has the correlation relationship, and allocates different alarm type identities separately.

S209. The VNF reports the second alarm information set to the EMS.

S210. The EMS performs correlation analysis on alarm information in the first alarm information set and alarm information in the second alarm information set and dispatches a work order.

Specifically, the EMS performs correlation analysis on alarm information in the first alarm information set and alarm information in the second alarm set. The alarm information in the first alarm information set includes alarm information generated at the infrastructure layer and the virtualization layer. The alarm information in the second alarm information set includes alarm information at a service layer. The EMS may perform correlation analysis on the alarm information in the first alarm information set and the alarm information in the second alarm information set according to the preset correlation rule, and dispatch a configured work order for the alarm information that has the correlation relationship. In this way, correlation analysis is performed on alarm information at multiple layers, and the work order is dispatched for the alarm information that has the correlation relationship, thereby reducing a quantity of work orders.

Further, that the EMS performs correlation analysis on the first alarm information set and the second alarm information set, and dispatches a configured work order for the alarm information that has the correlation relationship includes:

extracting a managed object identity that is carried in alarm information in the first alarm information set;

querying, in the first alarm information set and the second alarm information set and based on an association between managed object identities, the alarm information that has the correlation relationship; and dispatching the configured work order for the alarm information that has the correlation relationship.

Specifically, different managed objects are distributed at the infrastructure layer, the virtualization layer, and the service layer, where the service layer serves as a top layer, the virtualization layer serves as a medium layer, and the infrastructure layer serves as a bottom layer. A managed object at one layer has a specific correspondence with that at another layer. When a managed object at the infrastructure layer is faulty, corresponding managed objects at the virtualization layer and the service layer are also faulty. When managed objects at all layers are faulty, managed object identities are carried in alarm information. Managed object identities of the managed objects that have such correspondences are bounded together in advance to form an association. For example, Application 1 at the service layer, VM 1 at the virtualization layer, and Host 1 at the infrastructure layer have an association, so that an identity of Application 1, an identity of VM 1, and an identity of Host 1 are bound together to form an association.

The EMS extracts the managed object identity that is carried in the alarm information in the first alarm information set; queries, in the first alarm information set and the second alarm information set and based on the association, the alarm information that has the correlation relationship; and dispatches the configured work order for the alarm information that has the correlation relationship. For example, the first alarm information set includes alarm information 1, alarm information 2, alarm information 3, and alarm information 4, and the second alarm information set includes alarm information 5, alarm information 6, alarm information 7, and alarm information 8, where in the first alarm information set, alarm information 1 and alarm information 2 have a correlation relationship, and alarm information 3 and alarm information 4 have a correlation relationship. If a managed object identity that is carried in alarm information 1 and extracted by the EMS is an identity of VM 1, and it is found, according to an association "Application 1-VM 1-Host 1", that a managed object identity carried in alarm information 5 in the second alarm information set is an identity of Host 1, the EMS determines that alarm information 1, alarm information 2, alarm information 4, and alarm information 5 have a correlation relationship, and the EMS analyzes a fault cause according to the foregoing four pieces of alarm information and dispatches a configured work order.

By implementing this embodiment of the present invention, based on an association, correlation analysis may be performed on alarm information at different layers, alarm information at different layers that has a correlation relationship may be determined, a cross-layer association between alarm information may be implemented, and a same work order may be dispatched for alarm information of a same root cause, thereby reducing a quantity of dispatched work orders and reducing costs of operation and maintenance of a network.

Figure 4:
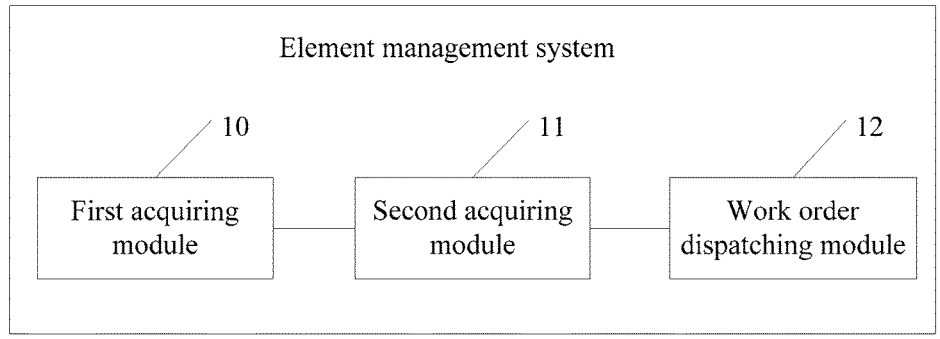
FIG. 4 is a schematic structural diagram of an element management system according to an embodiment of the present invention.

Referring to FIG. 4, FIG. 4 is a schematic structural diagram of an element management system according to an embodiment of the present invention. In this embodiment of the present invention, the element management system includes: a first acquiring module 10, a second acquiring module 11, and a work order dispatching module 12.

The first acquiring module 10 is configured to acquire a first alarm information set reported by a virtualized network function manager VNFM, where the first alarm information set is generated after the VNFM performs correlation analysis on at least one piece of network functions virtualization infrastructure NFVI alarm information and at least one piece of virtualized infrastructure manager VIM alarm information.

The second acquiring module 11 is configured to acquire a second alarm information set reported by a virtualized network function VNF, where the second alarm information set includes at least one piece of virtualized network function VNF alarm information.

The work order dispatching module 12 is configured to perform correlation analysis on the first alarm information set and the second alarm information set, and dispatch a configured work order for alarm information that has a correlation relationship.

Figure 5:
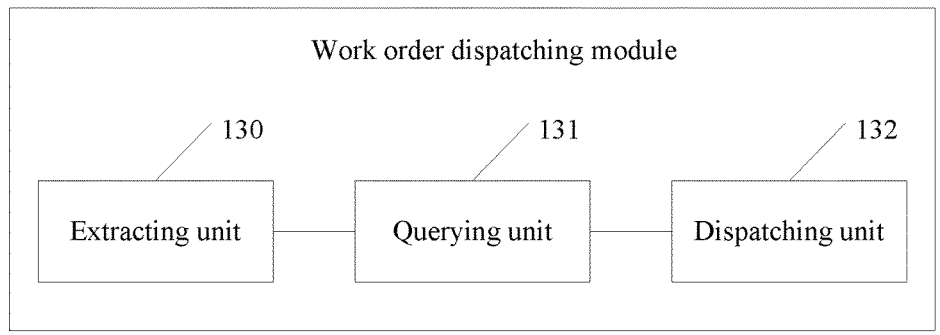
FIG. 5 is a schematic structural diagram of a work order dispatching module in FIG. 4.

Optionally, referring to FIG. 5, the work order dispatching module 12 includes an extracting unit 121, a querying unit 122, and a dispatching unit 123.

The extracting unit 121 is configured to extract a managed object identity that is carried in alarm information in the first alarm information set.

The querying unit 122 is configured to query, in the first alarm information set and the second alarm information set and based on an association between managed object identities, the alarm information that has the correlation relationship.

The dispatching unit 123 is configured to dispatch the configured work order for the alarm information that has the correlation relationship.

Optionally, alarm information in the second alarm information set carries the association between managed object identities, and alarm information in the first alarm information set carries a virtual machine VM identity, or a virtual network interface card vNIC identity.

Optionally, the VM identity is allocated by a NFVI or a MANO. The MANO includes a VNF, a VIM, and an NFVO.

Optionally, the alarm information that is in the first alarm information set and the second alarm information set and has the correlation relationship are classified into a same group, a group identity is allocated to each group, and a corresponding alarm type identity is allocated to root alarm information and derivative alarm information in each group.

This embodiment of the present invention and the method embodiment 1 are based on a same conception, and technical effects brought by this embodiment of the present invention and the method embodiment are also the same. For specific principles, refer to the description of the method embodiment 1, and details are not described herein again.

Figure 6:
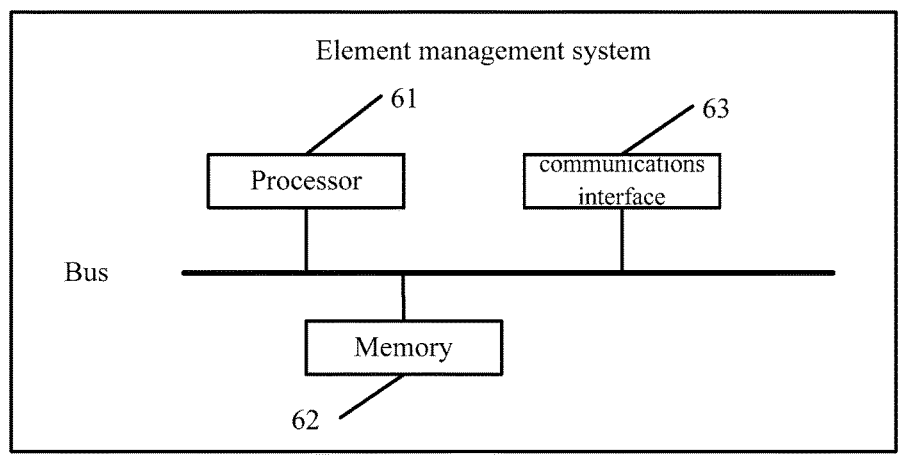
FIG. 6 is another schematic structural diagram of an element management system according to an embodiment of the present invention.

Referring to FIG. 6, FIG. 6 is another schematic structural diagram of an element management system according to an embodiment of the present invention. In this embodiment of the present invention, the element management system includes a processor 61, a memory 62, and a communications interface 63. The processor 61, the memory 62, and the communications interface 63 may be connected by using a bus or in another manner. Connection by using a bus is used as an example in FIG. 6.

The memory 62 is configured to store program code. Specifically, a program may include the program code, and the program code includes a computer operation instruction. The memory 62 may include a random access memory (RAM for short), and may further include a non-volatile memory, for example, at least one magnetic disk memory.

That the processor 61 executes the program code stored in the memory 62, and is configured to implement an alarm information processing method provided in an embodiment of the present invention, where the method includes:

acquiring a first alarm information set reported by a VNFM, where the first alarm information set is generated after the VNFM performs correlation analysis on at least one piece of NFVI alarm information and at least one piece of VIM alarm information;

acquiring a second alarm information set reported by a virtualized network function VNF, where the second alarm information set includes at least one piece of virtualized network function VNF alarm information; and performing correlation analysis on the first alarm information set and the second alarm information set, and dispatching a configured work order for alarm information that has a correlation relationship.

Optionally, that the processor 61 executes the performing correlation analysis on the first alarm information set and the second alarm information set, and dispatching a configured work order for alarm information that has a correlation relationship includes:

extracting a managed object identity that is carried in alarm information in the first alarm information set;

querying, in the first alarm information set and the second alarm information set and based on an association between managed object identities, the alarm information that has the correlation relationship; and dispatching the configured work order for the alarm information that has the correlation relationship.

Optionally, alarm information in the second alarm information set carries the association between managed object identities, and alarm information in the first alarm information set carries a virtual machine VM identity, or a virtual network interface card vNIC identity.

Optionally, the VM identity is allocated by the NFVI or the MANO.

Optionally, the alarm information that is in the first alarm information set and the second alarm information set and has the correlation relationship are classified into a same group, a group identity is allocated to each group, and a corresponding alarm type identity is allocated to root alarm information and derivative alarm information in each group.

Figure 7:
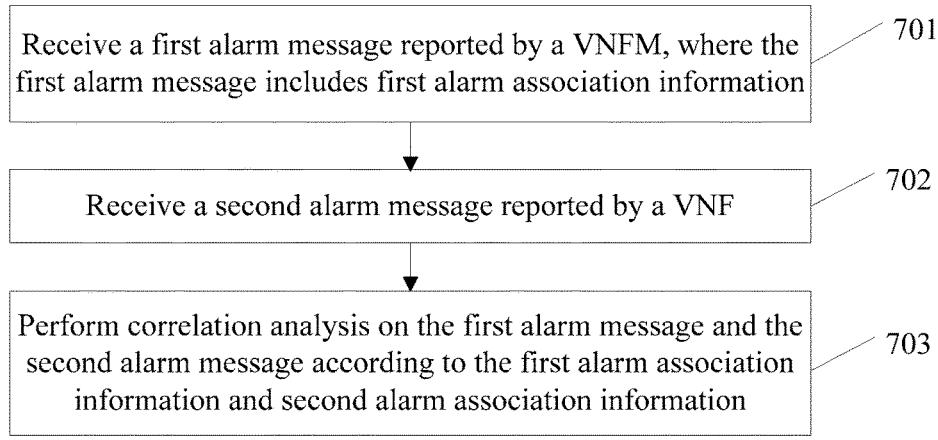
FIG. 7 is a schematic flowchart of an alarm information processing method according to an embodiment of the present invention.

Referring to FIG. 7, FIG. 7 shows an alarm information processing method according to an embodiment of the present invention. The method may be executed by an EMS, and the method includes the following steps:

701. Receive a first alarm message reported by a VNFM, where the first alarm message includes first alarm association information.

The first alarm association information includes at least one of the following: a first object identity and a preset association between object identities.

Further, the first object identity includes at least one of the following: a VNF identity, a virtual machine VM identity, and a virtual transmission resource identity of a VM.

The VM identity is used to uniquely identify a VM. Specifically, the VM identity may be a VM name, or may be a VM identifier (ID). The VNF identity is used to uniquely identify a VNF. The VNF identity may be specifically a VNF ID or a VNF name, which is not limited herein. The virtual transmission resource identity, for example, a VNIC ID, a VNIC name, a VPORT ID, or a VPORT name, of a VM is used to uniquely identify a VM, which is not limited herein.

In addition, the foregoing preset association between object identities is used to indicate an association between different object identities, for example, a correspondence between the VNF ID and the VM ID, for another example, a correspondence between the VNF ID, the VM ID, and a host (HOST) identity, or a correspondence between the VNF ID and the VNIC ID, which are not enumerated herein.

The HOST identity is a host identity at an NFVI infrastructure layer, is used to uniquely identify a HOST of an NFVI, and may be specifically a HOST ID, or a HOST name. The VIM is responsible for management of the NFVI, including management of the infrastructure layer, a virtualization layer, and an application layer of the NFVI.

Optionally, the first alarm message further includes a first alarm information set.

The first alarm message may include an alarm message or an alarm information group, that is, the first alarm information set may include at least one of the following: NFVI alarm information (including alarm information generated at the infrastructure layer and the virtualization layer), VM alarm information, and VNFM alarm information. The VNFM alarm information may be a piece of correlation alarm information generated by the VNFM, for example, may be generated by the VNFM performing correlation analysis on at least two pieces of alarm information reported by the VIM, or may be alarm information generated by a virtual machine corresponding to the VNFM. The NFVI alarm information may be alarm information generated by the NFVI. The VM alarm information may be alarm information generated by a VM corresponding to the VIM or a VM that the VIM is responsible for managing, or may be correlation alarm information generated by the VIM, for example, alarm information generated by the VIM performing correlation analysis on two pieces of NFVI alarm information. The foregoing description is merely illustrative, not limiting.

Further, the first alarm association information may be carried in the first alarm information set, or the first alarm association information may be independent of the first alarm information set.

Specifically, the first alarm association information may be carried in alarm information included in the first alarm information set. For example, the first alarm information set includes at least two pieces of VM alarm information, each piece of VM alarm information includes a VM identity, and the VM identity is the foregoing first alarm association information. For another example, the first alarm information set may include a piece of alarm information that includes a VM identity, and at least one piece of alarm information that includes a lower-level object identity (for example, a HOST ID of the NFVI).

Specifically, when all alarm information in the first alarm information set comes from a same object, the first alarm association information may be juxtaposed with the first alarm information set in the foregoing first alarm message. For example, if the first alarm association information is a VM ID, a structure of the first alarm message may be {VM ID, alarm information 1, alarm information 2, alarm information 3}, where alarm information 1, alarm information 2, and alarm information 3 form the first alarm information set.

The foregoing first alarm information set may further include a fault mode used to indicate a cause of a fault, for example, a high CPU usage or a fault in a hardware device, and details are not described again.

Optionally, the foregoing first alarm information set may further include a correlation identity used to indicate alarm information that has an association of a correlation. The correlation identity may be a group identity, and alarm information that has a same correlation group identity has a correlation. For example, in a first alarm information set {alarm information 1, group 1; alarm information 2, group 1}, alarm information 1 and alarm information 2 have a same group identity, which indicates that alarm information 1 and 2 have a correlation. Alternatively, the correlation identity may indicate a relationship between different alarms. For example, in a first alarm information set {alarm information 1, 0; alarm information 2, 1}, 0 indicates that alarm information 1 is a parent alarm, and 1 indicates that alarm information 2 is a child alarm, that is, alarm information 1 and 2 have a parent-child alarm relationship. Apparently, the first alarm information set may further be {alarm information 1, VM 1, 0, VM 2, 1; alarm information 2, VM 1, 0, VM 2, 1}, where VM 1 and VM 2 are respectively object identities of alarm information 1 and alarm information 2, 0 indicates a parent alarm, 1 indicates a child alarm, and then {VM 1, 0, VM 2, 1} indicates that alarm information 1 and 2 have a parent-child alarm relationship.

Optionally, the foregoing first alarm message may further include a root-cause alarm used to indicate a root cause of an alarm.

702. Receive a second alarm message reported by a VNF.

The second alarm message includes second alarm association information, and the second alarm association information includes at least one of the following: a second object identity and the preset association between object identities.

Optionally, the second alarm message may further include a second alarm information set, and the second alarm information set may include at least one piece of VNF alarm information.

Specifically, the second object identity is used to uniquely identify a second object, and the first object and the second object may be the same or different.

It should be noted that, the second alarm association information may be carried in the second alarm information set, or the second alarm association information may be independent of the second alarm information set. For specific details, refer to the description related to the first alarm association information in step 701, and details are not described herein again.

703. Perform correlation analysis on the first alarm message and the second alarm message according to the first alarm association information and second alarm association information.

Specifically, correlation analysis may be performed on the first alarm message and the second alarm message according to a preset correlation rule. For example, if the first alarm association information and the second alarm association information are the same, the first alarm message and the second alarm message have a correlation.

Optionally, when the first alarm message includes the first alarm information set, and the second alarm message includes the second alarm information set, step 703 may be specifically implemented in the following manners.

Manner 1:

Alarm information that has same alarm association information is acquired from the first alarm information set and the second alarm information set according to the first alarm association information and the second alarm association information; and correlation analysis is performed, according to the preset correlation rule, on the acquired alarm information that has the same alarm association information.

For example, the first alarm information set includes alarm information 1, alarm information 2, alarm information 3, and alarm information 4, and the second alarm information set includes alarm information 5, alarm information 6, alarm information 7, and alarm information 8, where in the first alarm information set, alarm information 1 and alarm information 2 include same alarm association information "VM 1", alarm information 3 and alarm information 4 respectively include alarm association information "VNF ID 1" and "VNF ID 2", and alarm information 5 carries VM 1. The EMS acquires alarm information that carries a managed object identity "VM 1", that is, alarm information 1, 2, and 5, and performs correlation analysis on alarm information 1, 2, and 5 according to the preset correlation rule; and if the correlation rule is a parent-child alarm, and alarm information 1 and 5 have a parent-child alarm relationship, searches alarm information 1, 2, and 5 for alarm information 1 and 5 that has the parent-child alarm relationship, and determines that alarm information 1 and 5 are alarm information that has a correlation.

It should be noted that, both the first alarm association information and the second alarm association information in the foregoing Manner 1 can be the preset association between object identities.

Manner 2:

A third alarm information set is acquired from the first alarm information set and the second alarm information set according to the preset association between object identities, the first object identity in the first alarm association information, and the second object identity in the second alarm association information, where the third alarm information set includes alarm information in which object identities are associated; and correlation analysis is performed on the third alarm information set according to the preset correlation rule.

The alarm information in which object identities are associated may include alarm information that has a same object identity, and include alarm information that includes an object identity that has an association with the same object identity.

It should be noted that, the preset association between object identities may be preset in the EMS, or may be configured to the EMS by using a communications interface, which is not limited.

The first object identity in the first alarm association information and the second object identity in the second alarm association information have different identity types. The identity types may include a VM identity, a HOST identity, and a virtual transmission resource identity of a VM.

For example, the first alarm information set includes alarm information 1 and alarm information 2, and the second alarm information set includes alarm information 3 and alarm information 4, where in the first alarm information set, an object identity included in alarm information 1 is VM name 1, an object identity included in alarm information 2 is Host name 1, and alarm information 3 and alarm information 4 respectively include object identities "VM name 1" and "VM name 2". If the preset association between object identities is Application name 1-VM name 1-Host name 1, that is, an association between an application name Application name 1 at a service layer, a VM name 1 at a virtualization layer, and Host name 1 at an infrastructure layer, the EMS acquires the third alarm information set, that is, alarm information 1, alarm information 2, and alarm information 3, and performs correlation analysis on the foregoing three alarms information according to the preset correlation rule. For specific details, refer to the description in Manner 1, and details are not described again.

It should be noted that the preset association between object identities may be specifically carried in the first alarm message or the second alarm message, or may be preset in the EMS, which is not limited herein.

Manner 3: When the first alarm message includes the correlation identity, correlation analysis is performed on the first alarm information set and the second alarm information set according to the correlation identity, the first alarm association information, and the second alarm association information.

For example, if the first alarm information set is {alarm information 1, group 1; alarm information 2, group 1}, where alarm information 1 includes VM 1 and alarm information 2 includes VM 2, and the second alarm information set is {alarm information 3, alarm information 4}, where alarm information 3 includes VM 1 and alarm information 4 includes VM 3, alarm information 1, 2 and 3 have a correlation relationship.

It should be noted that the preset correlation rule may be classified into a time correlation rule and a space correlation rule, for example, a parent-child alarm and a brotherly alarm. The correlation rule may be used immediately after on-site activation, an operation of a client for summarizing a rule and testing on site is avoided, and a default correlation rule has been analyzed by experts and verified by tests and has high accuracy. The correlation rule may be enabled or disabled according to a requirement, or if the correlation rule includes several sub-rules, one or more of the sub-rules may be enabled or disabled according to a requirement.

In this embodiment of the present invention, correlation analysis is performed on VNF alarm information and alarm information reported by the VNFM, alarm information at different layers that has a correlation relationship is determined, and a cross-layer association between alarm information is implemented, thereby avoiding complexity for manually analyzing an alarm, reducing time for analyzing an alarm, and reducing costs of operation and maintenance of a network.

Optionally, in an implementation scenario of this embodiment of the present invention, after step 703, the foregoing method further includes:

dispatching, by the EMS, a configured work order for the alarm information that has the correlation relationship.

Optionally, in another implementation scenario of this embodiment of the present invention, after step 703, the method further includes:

classifying the alarm information that is in the first alarm information set and the second alarm information set and has the correlation relationship into a same group, and allocating a group identity to the classified group.

Figure 8:
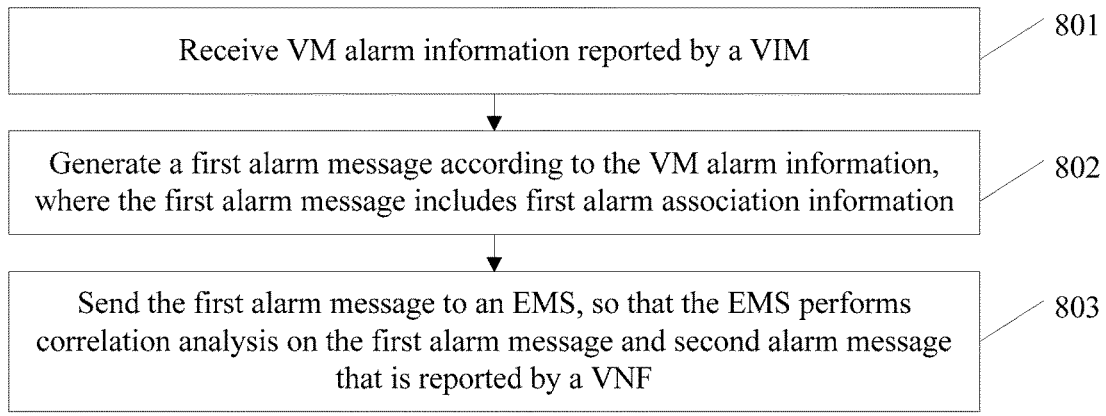
FIG. 8 is a schematic flowchart of another alarm information processing method according to an embodiment of the present invention.

Referring to FIG. 8, FIG. 8 shows another alarm information processing method according to an embodiment of the present invention. The method is executed by a VNFM, and specifically includes the following steps:

801. Receive VM alarm information reported by a VIM.

The VM alarm information may include a third object identity used to uniquely identify a third object, and the third object identity may include at least one of the following: a VM identity, a HOST identity, and a virtual transmission resource identity of a virtual machine. The VM identity is used to uniquely identify a VM; the HOSY identity is used to uniquely identify a HOST of an NFVI and may be specifically a HOST ID or a HOST name; the virtual transmission resource identity, for example, a VPORT ID or a VPORT name, for another example, a vNIC ID or a vNIC name, of a virtual machine is used to uniquely identify a VM.

Optionally, the VM alarm information further includes a fault mode used to indicate a cause of a fault, for example, a high CPU usage or a fault in a hardware device, which is not limited; or may include a correlation identity, where the correlation identity may be a group identity, and alarm information that has a same correlation group identity has a correlation, or the correlation identity may be a relationship between different alarms. For specific details, refer to the related description in step 701 in FIG. 7.

Specifically, the VM alarm information may be VM correlation alarm information reported after the VIM performs correlation analysis on at least two pieces of alarm information (for example, one piece of NFVI alarm information and one piece of VM alarm information; for another example, at least two pieces of NFVI alarm information or at least two pieces of VM alarm information), may be NFVI alarm information reported by the NFVI, may be VM alarm information generated by a VM corresponding to the VIM itself, or may be alarm information generated by a VM that the VIM is responsible for managing.

802. Generate a first alarm message according to the VM alarm information, where the first alarm message includes first alarm association information.

Optionally, the first alarm message further includes a first alarm information set.

For related descriptions of the first alarm association information and the first alarm information set, refer to step 701.

803. Send the first alarm message to an EMS, so that the EMS performs correlation analysis on the first alarm message and second alarm message that is reported by a VNF.

Specifically, in step 802, the generating a first alarm message according to the VM alarm information may be specifically implemented in the following two manners:

Manner 1:

A VNF identity corresponding to the third object identity is obtained according to a preset correspondence between the third object identity and a VNF identity and the third object identity in the VM alarm information, the obtained VNF identity is used as the first object identity to generate the first alarm message.

For example, the first alarm message may include only the first object identity. In addition, content of the VM alarm information may further be used as the first alarm information set, and details are not described again.

Manner 2: Correlation analysis is performed on the VM alarm information to generate the first alarm message.

When all alarm information in the VM alarm information includes identities of a same type, the VNFM performs correlation analysis on the VM alarm information according to the identities of the same type and uses the identities of the same type as the first alarm association information.

It should be noted that the identities of the same type may be VM identities, may be HOST identities, or may be vNIC identities, and details are not described again.

When a type of an identity included in at least one piece of alarm information in the VM alarm information is different from a type of an identity included in other alarm information in the VM alarm information, the VNFM performs correlation analysis on the VM alarm information according to a preset configuration relationship to obtain the first alarm association information.

For example, if the type of the identity included in the foregoing at least one piece of alarm information is a HOST identity, that is, the at least one piece of alarm information is reported from a bottom layer of the NFVI, and the other alarm information includes a VM identity, that is, the other alarm information is reported from a virtualization layer of the NFVI or by the VM, the VNFM acquires a configuration relationship between the VM and a HOST, obtains, according to the acquired configuration relationship, a VM identity corresponding to the HOST identity, and then performs correlation analysis on the VM alarm information according to the VM identity. Apparently, a HOST identity corresponding to the VM identity in the other alarm information in the VM alarm information may also be obtained according to the configuration relationship, and correlation analysis is then performed on the VM alarm information according to the HOST identity.

When the VM alarm information includes the correlation identity, correlation analysis is performed on the VM alarm information according to the correlation identity included in the VM alarm information and the third object identity carried in the VM alarm information, so as to generate the first alarm message.

Optionally, before the generating a first alarm message, the method may further include allocating a correlation identity to VM alarm information that has a correlation.

Further, the generated first alarm message may further include the allocated correlation identity.

For example, if one piece of VM alarm information is {NFVI alarm information 1, group 1; NFVI alarm information 2, group 1}, and another piece of VM alarm information is NFVI alarm information 3, where NFVI alarm information 1 includes VM 1, NFVI alarm information 2 includes host 1, and NFVI alarm information 3 includes VM 1, NFVI alarm information 1, 2, and 3 have a correlation.

A configuration relationship between the VM and the HOST may be a correspondence between the virtual machine and the host.

It should be noted that, similarly, the first alarm association information in the first alarm message in Manner 2 may be acquired by using the method provided in the foregoing Manner 1, and details are not described again.

In this embodiment of the present invention, a VNFM reports a first alarm message to an EMS, so that the EMS performs analysis of a correlation with VNF alarm information according to the first alarm message, and further determines alarm information at different layers that has a correlation relationship, which implements a cross-layer association between alarm information, avoids complexity for manually analyzing an alarm, and reduces time for analyzing an alarm, thereby reducing costs of operation and maintenance of a network.

Figure 9:
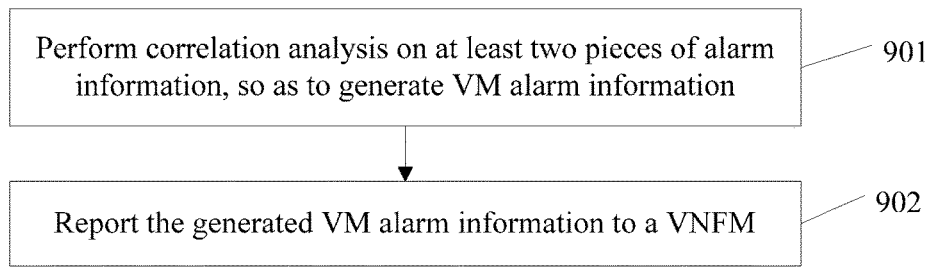
FIG. 9 is a schematic flowchart of still another alarm information processing method according to an embodiment of the present invention.

Referring to FIG. 9, FIG. 9 shows another alarm information processing method according to an embodiment of the present invention. The method is executed by a VIM, and specifically includes the following steps:

901. Perform correlation analysis on at least two pieces of alarm information, so as to generate VM alarm information.

The at least two pieces of alarm information may include: at least one piece of NFVI alarm information and at least one piece of VM alarm information; or the at least two pieces of alarm information are all NFVI alarm information or all VM alarm information, which is not limited.

The VM alarm information is VM correlation alarm information, and may include at least one of a VM identity, a HOST identity, and a virtual transmission resource identity of a virtual machine. For a related description, refer to step 901, and details are not described again.

Specifically, the VM correlation alarm information may be in the following three forms:

Form 1: The VM correlation alarm information includes only a VM identity.

Form 2: The VM correlation alarm information includes a VM identity and a lower-level object identity, and the lower-level object identity may include an NFVI identity in associated NFVI alarm information in the VM correlation alarm information, where the NFVI identity may include at least one of a VM identity, a HOST identity, and a virtual transmission resource identity of a virtual machine.

For example, the VIM performs correlation analysis on first NFVI alarm information reported from a first NFVI virtualization layer and second NFVI alarm information reported from a first NFVI infrastructure layer (for example, an NFVI HOST), where the first NFVI alarm information includes a VM ID, the second NFVI alarm information includes a HOST ID. If the two pieces of alarm information have a correlation, the generated VM correlation alarm information includes the VM ID and the lower-level identity HOST ID.

Form 3: The VM correlation alarm information includes at least two pieces of alarm information and correlation identities of the at least two pieces of alarm information.

The correlation identities may be group identities, and alarm information that has a same correlation group identity has a correlation, or the correlation identities may be a relationship between different alarms. For specific details, refer to the related description in step 701 in FIG. 7. Further, the correlation identities may further include a root-cause alarm identity used to indicate a root cause of the VM correlation alarm information.

902. Report the generated VM alarm information to a VNFM.

In this embodiment of the present invention, the VIM performs correlation analysis on at least two pieces of alarm information, which reduces complexity for manually analyzing an alarm and reduces time for analyzing an alarm. In addition, correlation analysis is performed by the VIM on alarm information, which greatly reduces load on the VNFM.

Optionally, before step 901, the foregoing method may further include:

receiving NFVI alarm information reported by an NFVI, where the NFVI alarm information includes an NFVI identity.

The NFVI identity may include at least one of a VM identity, a HOST identity, a virtual transmission resource identity of a virtual machine.

The NFVI alarm information may be specifically reported from a virtualization layer or a bottom layer of the NFVI.

Figure 10:
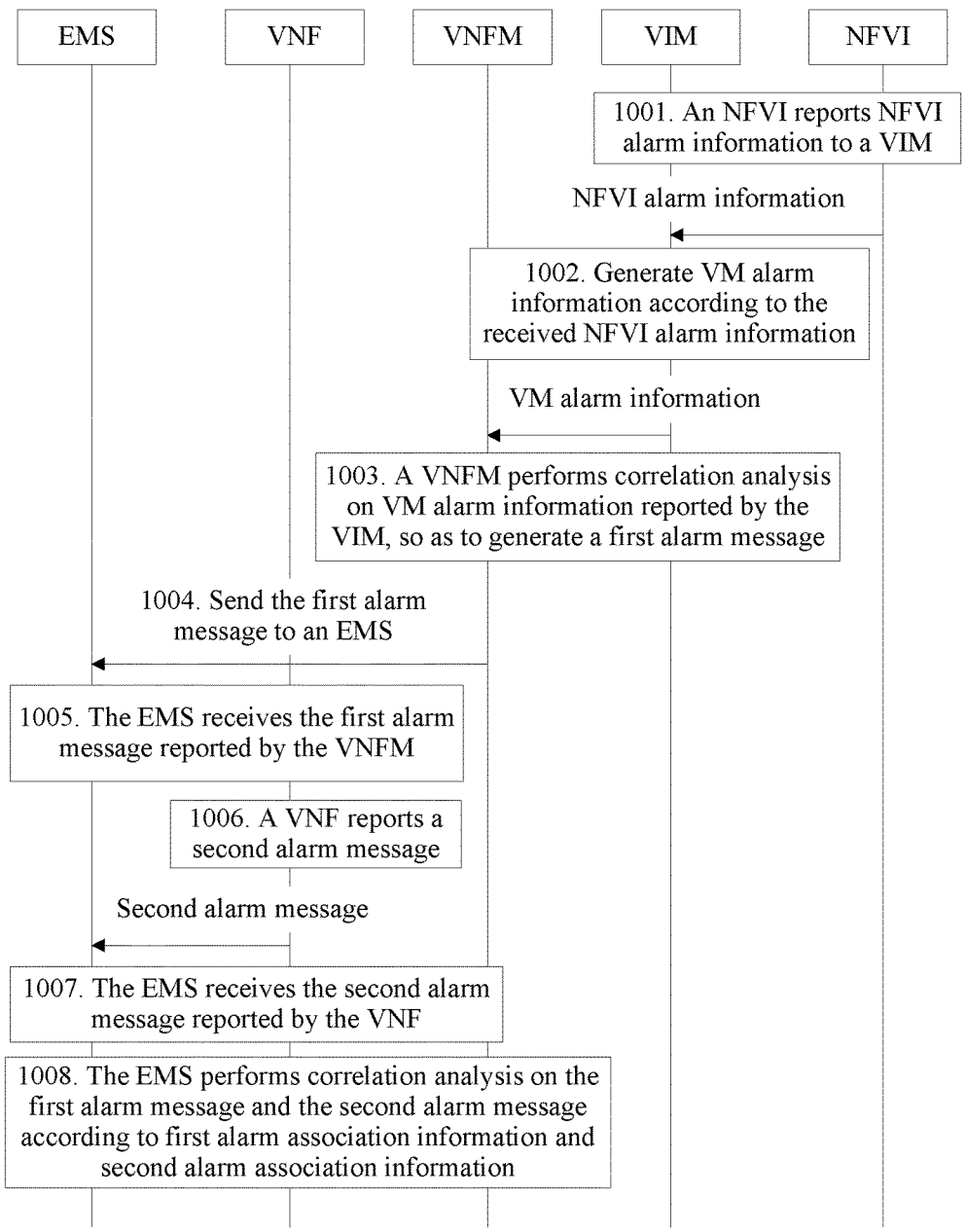
FIG. 10 is a schematic diagram of interaction of another alarm information processing system according to an embodiment of the present invention.

Referring to FIG. 10, FIG. 10 shows another alarm information processing method according to an embodiment of the present invention. The method includes the following steps:

1001. An NFVI reports NFVI alarm information to a VIM.

For a related description of the NFVI alarm information, refer to the embodiment in FIG. 9.

1002. The VIM receives the NFVI alarm information and generates VM alarm information according to the received NFVI alarm information.

Step 1002 may be specifically implemented in the following two manners:

Manner 1: Correlation analysis is performed on the reported NFVI alarm information, so as to generate VM correlation alarm information.

Manner 2: The VIM directly reports the received NFVI alarm information to a VNFM.

The NFVI alarm information may be generated by a same NFVI or different NFVIs, and the VM alarm information may also be generated by a same VIM or different VIMs, which is not limited herein.

For example, when an object in the NFVI is faulty, the NFVI reports the NFVI alarm information to the VIM. When the NFVI is faulty, which causes the VIM to be faulty, the VIM reports the NFVI alarm information and the VIM alarm information to the VNFM. The VNFM performs correlation analysis on the NFVI alarm information and the VIM alarm information to generate the foregoing first alarm information set.

For another example, when a managed object in the NFVI is faulty, the NFVI reports the NFVI alarm information to the VIM. When the NFVI is faulty, the VIM is also faulty and generates VIM alarm information. The VIM performs correlation analysis on the NFVI alarm information and the VIM alarm information, and sends, to the VNFM, the VIM alarm information obtained after correlation analysis is performed. The VNFM performs correlation analysis on at least two pieces of VIM alarm information to generate the foregoing first alarm information set.

It should be noted that both the foregoing NFVI alarm information and the foregoing VIM alarm information may carry parameters such as an object identity, alarm, and an alarm severity, which is not limited herein. The foregoing NFVI alarm information includes a NFVI identity, and the NFVI identity may include at least one of a VM ID, a host ID, and a vNIC ID.

For a related description of the VM alarm information and performing correlation analysis by the VIM, refer to the embodiment shown in FIG. 8 or 9.

1003. A VNFM performs correlation analysis on VM alarm information reported by the VIM, so as to generate a first alarm message.

The VM alarm information may include at least two of NFVI alarm information and VM alarm information.

The first alarm message may include first alarm association information, and may further include the first alarm information set. For a specific description, refer to the related description in the embodiment in FIG. 7 or 8, and details are not described herein again.

Specifically, the first alarm information set may be generated after the VNFM performs correlation analysis on at least one piece of NFVI alarm information and at least one piece of VIM alarm information, or may be generated after the VNFM performs correlation analysis on at least two pieces of VIM alarm information.

Specifically, the first alarm association information includes at least one of the following: a first object identity and a preset association between object identities. The first object identity is used to uniquely identify an object and may be a VNF identity or a VM identity, for example, may be a VNF ID, a VM ID, or a vNIC ID, or may be a VNF name, a VM name, or a vNIC name. The preset association between object identities may be used to indicate an association between different object identities, for example, a correspondence between the VNF ID and the VM ID, for another example, a correspondence between the VNF ID, VM ID, and a HOST ID, which are not enumerated herein again.

Specifically, in step 1003, the VNFM may perform correlation analysis on the at least one piece of NFVI alarm information and the at least one piece of VIM alarm information according to a correlation rule, determine alarm information that has a correlation, and group together the alarm information that has the correlation, so that the VNFM may shield the at least one piece of NFVI alarm information or the at least one piece of VIM alarm information to reduce the amount of alarm information. After the foregoing processing, the first alarm information set is generated, and the VNFM reports the first alarm information set to an EMS, where the first alarm information set may be represented in a form of a fault tree.

1004. The VNFM sends the first alarm message to an EMS.

1005. The EMS receives the first alarm message reported by the VNFM.

1006. A VNF reports a second alarm message.

The second alarm message may include second alarm association information, and may further include a second alarm information set. For specific details, refer to the related description in the embodiment shown in FIG. 7.

Specifically, the second alarm association information may be used by the EMS to perform correlation analysis on the second alarm information set, where the second alarm association information includes at least one of the following: a second object identity and the preset association between object identities. The second object identity is used to uniquely identify a managed object and may be a VNF identity, a VM identity, or a vNIC identity, for example, may be a VNF ID or a VM ID, or may be a VNF name or a VM name. The preset association between object identities may be used to indicate an association between managed object identities, for example, a correspondence between the VNF ID and the VM ID, for another example, a correspondence between the VNF ID, VM ID, and a HOST ID, which are not enumerated herein again.

Optionally, the second alarm association information may be carried in the second alarm information set. For example, alarm information included in the second alarm information set carries the second alarm association information. Alternatively, the second alarm association information may be independent of the second alarm information set. For example, when all alarm information in the second alarm information set comes from a same managed object, the second alarm association information may be juxtaposed with the second alarm information set in the foregoing first alarm message, which is not limited herein.

The second alarm information set may include at least one piece of VNF alarm information, and the at least one piece of VNF alarm information may be generated by a same VNF or different VNFs.

Specifically, when the VNF detects a fault in the VNF, at least one piece of alarm information is generated, where the second alarm information set includes the at least one piece of alarm information, and the VNF reports the second alarm information set to the EMS.

It should be noted that before reporting an alarm, the VNF may obtain, according to a VNF identity of a VNF that generates the alarm, and a correspondence between a VNF identity and a VM identity or a correspondence between a VNF identity and a vNIC identity, a VM identity or a vNIC identity corresponding to the VNF identity.

1007. The EMS receives the second alarm message reported by the VNF.

It should be noted that steps 1006 to 1007 may not be necessarily executed after steps 1001 to 1005, which is not limited.

1008. The EMS performs correlation analysis on the first alarm message and the second alarm message according to first alarm association information and second alarm association information.

Step 1008 may be implemented in the specific implementation manners of step 703 in the embodiment shown in FIG. 7, and details are not described again.

Specifically, alarm information in the first alarm information set may include alarm information generated at an infrastructure layer and a virtualization layer, alarm information in the second alarm information set may include alarm information at a service layer, and the EMS may perform correlation analysis on the alarm information in the first alarm information set and the alarm information in the second alarm information set according to a preset correlation rule, perform integration on alarm information that has a correlation relationship, which avoids a process of manual analysis, greatly reduces time for analyzing an alarm, and improves working efficiency.

The preset correlation rule may be specifically classified into a time correlation rule and a space correlation rule, for example, a parent-child alarm and a brotherly alarm. The EMS searches, according to the correlation rule, the foregoing two alarm sets for alarm information that has an association, for example, determines root alarm information and derivative alarm information.

By using the method provided in this embodiment, the EMS performs correlation analysis on the alarm information in the first alarm information set and the alarm information in the second alarm information set, which implements analysis and integration of cross-layer alarm information, avoids a process of manual analysis, greatly reduces time for analyzing an alarm, and improves working efficiency.

Optionally, before the EMS receives the first alarm message reported by the VNFM, the method further includes:

configuring, by the VNFM, the association, between object identities, for the VNF.

Specifically, the VNFM configures the association, between object identities, for the VNF, the alarm information in the second alarm information set reported by the VNF to the EMS carries the association between object identities. Furthermore, the alarm information in the second alarm information set further carries an object identity of a faulty object, and the alarm information in the first alarm information set also carries an object identity of a faulty object. The EMS may query, in the first alarm information set and the second alarm information set according to the association between object identities that is carried in the alarm information in the second alarm information set, alarm information that has the correlation relationship. Object identities carried in the alarm information in the first alarm information set include, for example, a VM ID or a vNIC ID; the association between object identities that is carried in the alarm information in the second alarm information set is: VNF ID-VM ID-vNIC ID, where the association between object identities indicates an association between object identities that are at the service layer, the virtualization layer, and the infrastructure layer and that have a correspondence.

It should be noted that, in the foregoing embodiments, different objects are distributed at an infrastructure layer, a virtualization layer, and a service layer, where the service layer serves as a top layer, the virtualization layer serves as a medium layer, and the infrastructure layer serves as a bottom layer. An object at one layer has a specific correspondence with that at another layer. When an object at the infrastructure layer is faulty, corresponding objects at the virtualization layer and the service layer are faulty. When objects at all layers are faulty, alarm information at different layers of a same virtual apparatus may be obtained by carrying an object identity or an association between object identities in alarm information, so as to further confirm whether alarm information at all layers of the same virtual apparatus is caused by a same fault, that is, to confirm a correlation between alarm information.

Figure 11:
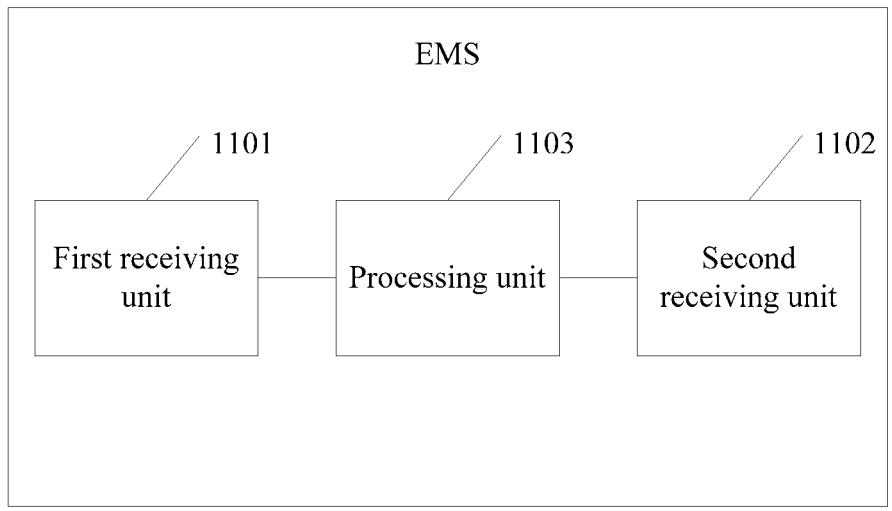
FIG. 11 is a schematic structural diagram of an alarm information processing apparatus according to an embodiment of the present invention.

Referring to FIG. 11, FIG. 11 shows an alarm information processing apparatus according to an embodiment of the present invention. The apparatus may be an EMS. The apparatus may be configured to execute operating steps of the EMS in FIG. 7 or FIG. 10. The apparatus may specifically include a first receiving unit 1101, a second receiving unit 1102, and a processing unit 1103.

The first receiving unit 1101 is configured to receive a first alarm message reported by a VNFM, where the first alarm message includes first alarm association information, and the first alarm association information includes at least one of the following: a first object identity and a preset association between object identities.

The second receiving unit 1102 is configured to receive a second alarm message reported by a VNF, where the second alarm message includes second alarm association information, and the second alarm association information includes at least one of the following: a second object identity and the preset association between object identities.

The processing unit 1103 is configured to perform, according to the first alarm association information and the second alarm association information, correlation analysis on the first alarm message received by the first receiving unit 1101 and the second alarm message received by the second receiving unit 1102.

Optionally, the first object identity includes at least one of the following: a VNF identity, a virtual machine VM identity, and a virtual transmission resource identity of a VM.

Optionally, the second object identity includes at least one of the following: a VNF identity, a VM identity, and a virtual transmission resource identity of a VM.

The preset association between object identities is used to indicate an association between different object identities; where the VNF identity includes a VNF identifier ID or a VNF name, the VM identity includes a VM ID or a VM name, and the virtual transmission resource identity includes a virtual transmission resource ID or a virtual transmission resource name.

Optionally, the first alarm message further includes a first alarm information set, and the first alarm information set includes at least one of the following: NFVI alarm information, VM alarm information, and VNFM alarm information.

For the NFVI alarm information, the VM alarm information, and the VNFM alarm information, refer to the related descriptions in method embodiments in FIG. 7 to FIG. 10, and details are not described again.

Optionally, the second alarm message further includes a second alarm information set, and the second alarm information set includes at least one piece of VNF alarm information.

For a related description of the VNF alarm information, refer to the embodiment shown in FIG. 7 or FIG. 10.

Optionally, when the first alarm message includes the first alarm information set, and the second alarm information includes the second alarm information set, the processing unit 1103 is specifically configured to:

acquire, from the first alarm information set and the second alarm information set according to the first alarm association information and the second alarm association information, alarm information that has same alarm association information, and perform, according to a preset correlation rule, correlation analysis on the acquired alarm information that has the same alarm association information; or acquire a third alarm information set from the first alarm information set and the second alarm information set according to the preset association between object identities, the first object identity, and the second object identity, where the third alarm information set includes alarm information in which object identities are associated; and perform correlation analysis on the third alarm information set according to a preset correlation rule.

It should be noted that, for related descriptions of the foregoing preset correlation rule, the alarm information in which object identities are associated, and the preset association between object identities, refer to step 703 in the embodiment shown in FIG. 7, and details are not described herein again.

By using the EMS provided in this embodiment of the present invention, correlation analysis is performed on VNF alarm information and alarm information that is reported by a VNFM, and alarm information at different layers that has a correlation relationship is determined, which implements a cross-layer association between alarm information, avoids complexity for manually analyzing an alarm, and reduces time for analyzing an alarm, thereby reducing costs of operation and maintenance of a network.

Figure 12:
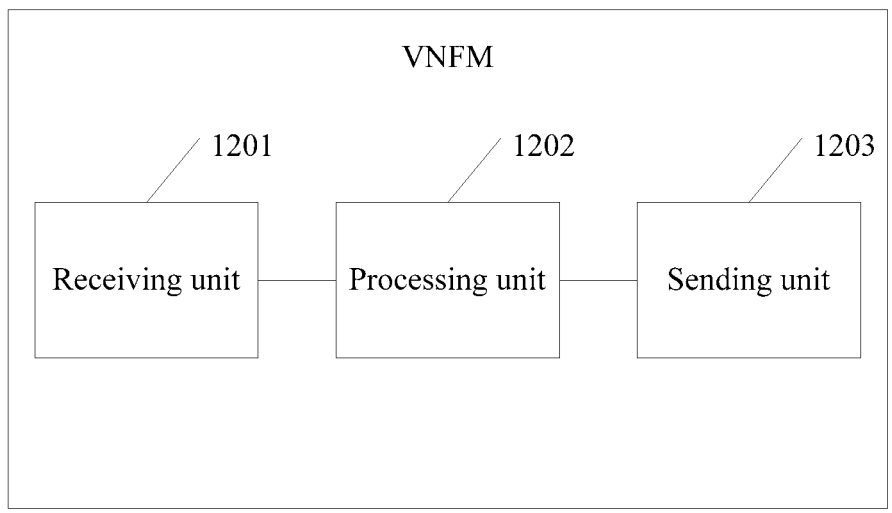
FIG. 12 is a schematic structural diagram of another alarm information processing apparatus according to an embodiment of the present invention.

Referring to FIG. 12, FIG. 12 shows an alarm information processing apparatus according to an embodiment of the present invention. The apparatus may be a VNFM. The apparatus may be specifically configured to execute the method executed by the VNFM in the embodiment shown in FIG. 8 or FIG. 10. The apparatus may specifically include:
a receiving unit 1201, configured to receive virtual machine VM alarm information reported by a virtualized infrastructure manager VIM, where the VM alarm information includes a third object identity;
a processing unit 1202, configured to generate a first alarm message according to the VM alarm information received by the receiving unit 1201, where the first alarm message includes first alarm association information, and the first alarm association information includes at least one of the following: a first object identity and a preset association between object identities; and
a sending unit 1203, configured to send the first alarm message generated by the processing unit 1202 to an element management system EMS, so that the EMS performs correlation analysis on the first alarm message and second alarm message that is reported by a VNF.

The third object identity may include at least one of the following: a VM identity, a host HOST identity at an NFVI infrastructure layer, and a virtual transmission resource identity of a VM.

The VM identity may include a VM identifier ID or a VM name, the HOST identity may include a HOST ID or a HOST name, and the virtual transmission resource identity of a VM may include a virtual transmission resource ID or a virtual transmission resource name.

Specifically, the virtual transmission resource identity, for example, a VPORT ID or a VPORT name, for another example, a vNIC ID or a vNIC name, of a VM is used to uniquely identify a VM.

The first object identity may be used to uniquely identify a first object, and the first object identity may include at least one of the following: a VNF identity, a VM identity, and a virtual transmission resource identity of a VM.

The preset association between object identities may be used to indicate an association between different object identities.

Optionally, the first alarm message further includes first alarm information set, and the first alarm information set includes at least one of the following: NFVI alarm information, VM alarm information, and VNFM alarm information.

For related descriptions of all the foregoing alarm information, refer to the embodiment shown in FIG. 7 or FIG. 8, and details are not described again.

Optionally, the processing unit 1202 is specifically configured to:
obtain, according to a preset correspondence between the third object identity and a VNF identity and the third object identity in the VM alarm information, a VNF identity corresponding to the third object identity, and use the obtained VNF identity as the first object identity to generate the first alarm message; or
perform correlation analysis on the VM alarm information to generate the first alarm message.

For specific details, refer to the two implementation manners of step 803 in the embodiment shown in a figure, and details are not described again.

By using the VNFM provided in this embodiment of the present invention, a first alarm message is reported to an EMS, so that the EMS performs analysis of a correlation with VNF alarm information according to the first alarm message, and further determines alarm information at different layers that has a correlation relationship, which implements a cross-layer association between alarm information, avoids complexity for manually analyzing an alarm, and reduces time for analyzing an alarm, thereby reducing costs of operation and maintenance of a network.

Figure 13:
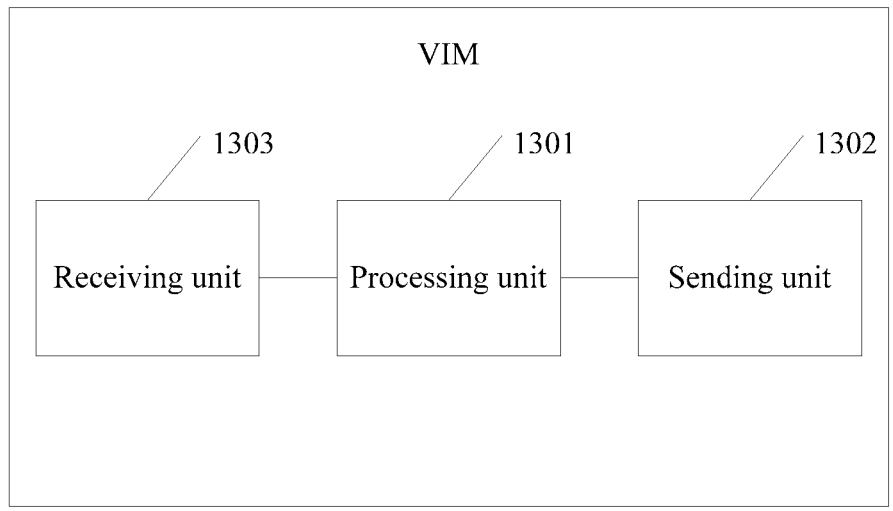
FIG. 13 is a schematic structural diagram of still another alarm information processing apparatus according to an embodiment of the present invention.

Referring to FIG. 13, FIG. 13 shows an alarm information processing apparatus according to an embodiment of the present invention. The apparatus is a VIM. The apparatus may be configured to execute operating steps of the VIM in the embodiment shown in FIG. 9 or FIG. 10 and may specifically include a processing unit 1301 and a sending unit 1302.

The processing unit 1301 is configured to perform correlation analysis on at least two pieces of alarm information to generate virtual machine VM alarm information.

The sending unit 1302 is configured to report the VM alarm information generated by the processing unit 1301 to a virtualized network function manager VNFM, so that the VNFM reports, according to the VM alarm information, a first alarm message to an element management system EMS, where the EMS performs correlation analysis on the first alarm message and second alarm message that is reported by a VNF.

The at least two pieces of alarm information may include:
at least one piece of network functions virtualization infrastructure NFVI alarm information and at least one piece of VM alarm information; or
at least two pieces of NFVI alarm information; or
at least two pieces of VM alarm information.

Optionally, the foregoing apparatus further includes:
a receiving unit 1303, configured to receive NFVI alarm information reported by an NFVI, where the NFVI alarm information includes an NFVI identity; and
the processing unit 1301, configured to perform correlation analysis on the NFVI alarm information received by the receiving unit 1303, so as to generate the VM alarm information; where
the NFVI identity includes at least one of a VM identity, a HOST identity, and a virtual transmission resource identity of a virtual machine, the VM identity includes a VM identifier ID or a VM name, the HOST identity includes a HOST ID or a HOST name, and the virtual transmission resource identity of a VM includes a virtual transmission resource ID or a virtual transmission resource name.

By using the VIM provided in this embodiment of the present invention, correlation analysis is performed on at least two pieces of alarm information, which reduces complexity for manually analyzing an alarm and reduces time for analyzing an alarm. In addition, correlation analysis is performed by the VIM on alarm information, which greatly reduces load on a VNFM.

An embodiment of the present invention provides an alarm information processing system, including at least one of the following apparatuses: the alarm information processing apparatuses shown in FIG. 11 to FIG. 13.

Figure 14:
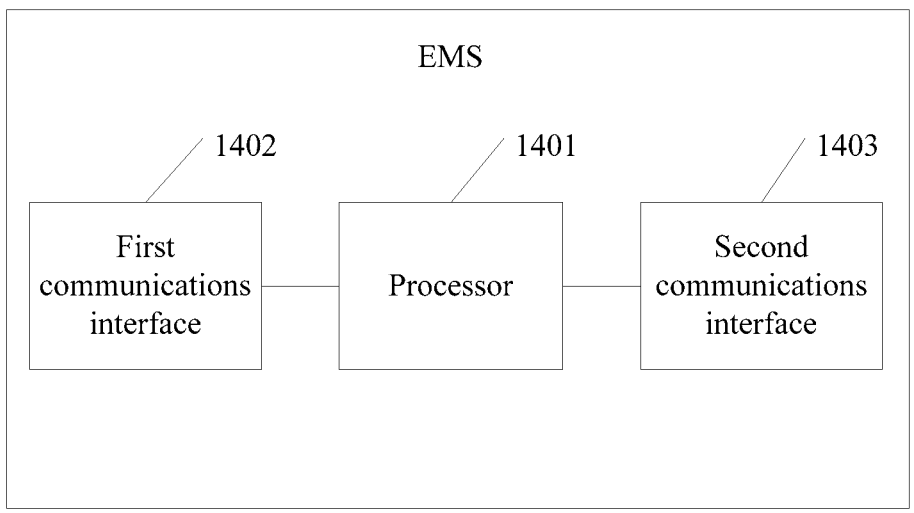
FIG. 14 is a schematic structural diagram of an alarm information processing apparatus according to an embodiment of the present invention.

Referring to FIG. 14, an embodiment of the present invention further provides another alarm information processing apparatus. The apparatus is an EMS and includes a processor 1401, a first communications interface 1402, and a second communications interface 1403.

The first communications interface 1402 is configured to receive a first alarm message reported by a VNFM, where the first alarm message includes first alarm association information, and the first alarm association information includes at least one of the following: a first object identity and a preset association between object identities.

The second communications interface 1403 is configured to receive a second alarm message reported by a VNF, where the second alarm message includes second alarm association information, and the second alarm association information includes at least one of the following: a second object identity and the preset association between object identities.

The processor 1401 is configured to perform, according to the first alarm association information and the second alarm association information, correlation analysis on the first alarm message received by the first communications interface 1402 and the second alarm message received by the second communications interface 1403.

Optionally, the first object identity includes at least one of the following: a VNF identity, a virtual machine VM identity, and a virtual transmission resource identity of a VM.

Optionally, the second object identity includes at least one of the following: a VNF identity, a VM identity, and a virtual transmission resource identity of a VM.

The preset association between object identities is used to indicate an association between different object identities; where the VNF identity includes a VNF identifier ID or a VNF name, the VM identity includes a VM ID or a VM name, and the virtual transmission resource identity includes a virtual transmission resource ID or a virtual transmission resource name.

Optionally, the first alarm message further includes a first alarm information set, and the first alarm information set includes at least one of the following: NFVI alarm information, VM alarm information, and VNFM alarm information.

For the NFVI alarm information, the VM alarm information, and the VNFM alarm information, refer to the related descriptions in method embodiments in FIG. 7 to FIG. 10, and details are not described again.

Optionally, the second alarm message further includes a second alarm information set, and the second alarm information set includes at least one piece of VNF alarm information.

For a related description of the VNF alarm information, refer to the embodiment shown in FIG. 7 or FIG. 10.

Optionally, when the first alarm message includes the first alarm information set, and the second alarm information includes the second alarm information set, the processor 1401 is specifically configured to:
  acquire, from the first alarm information set and the second alarm information set according to the first alarm association information and the second alarm association information, alarm information that has same alarm association information, and perform, according to a preset correlation rule, correlation analysis on the acquired alarm information that has the same alarm association information; or
  acquire a third alarm information set from the first alarm information set and the second alarm information set according to the preset association between object identities, the first object identity, and the second object identity, where the third alarm information set includes alarm information in which object identities are associated; and perform correlation analysis on the third alarm information set according to a preset correlation rule.

It should be noted that, for related descriptions of the foregoing preset correlation rule, the alarm information in which object identities are associated, and the preset association between object identities, refer to step 703 in the embodiment shown in FIG. 7, and details are not described herein again.

Figure 15:
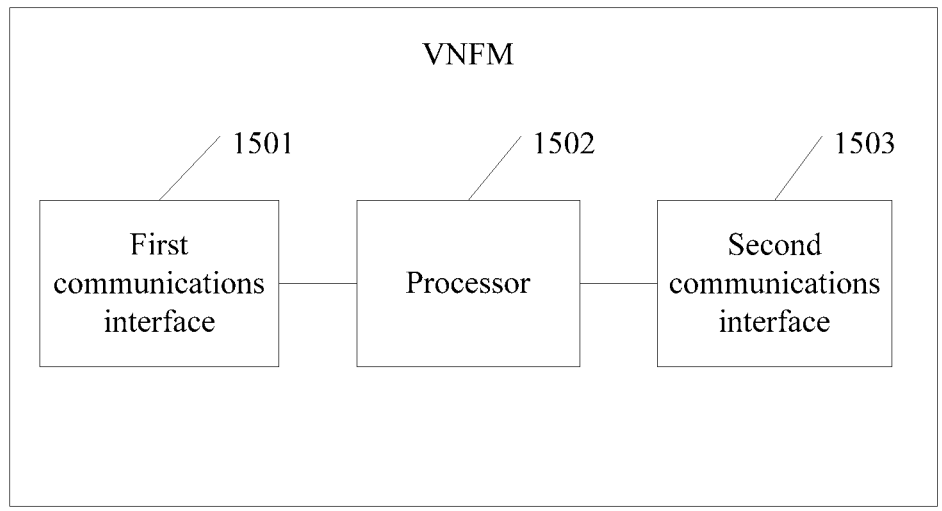
FIG. 15 is a schematic structural diagram of another alarm information processing apparatus according to an embodiment of the present invention.

Referring to FIG. 15, FIG. 15 shows an alarm information processing apparatus according to an embodiment of the present invention. The apparatus may be a VNFM. The apparatus may be specifically configured to execute the method executed by the VNFM in the embodiment shown in FIG. 8 or FIG. 10. The apparatus may specifically include:
  a first communications interface 1501, configured to receive virtual machine VM alarm information reported by a virtualized infrastructure manager VIM, where the VM alarm information includes a third object identity;
  a processor 1502, configured to generate a first alarm message according to the VM alarm information received by the first communications interface 1501, where the first alarm message includes first alarm association information, and the first alarm association information includes at least one of the following: a first object identity and a preset association between object identities; and
  a second communications interface 1503, configured to send the first alarm message generated by the processor 1502 to an element management system EMS, so that the EMS performs correlation analysis on the first alarm message and second alarm message that is reported by a VNF.

The third object identity may include at least one of the following: a VM identity, a HOST identity at an NFVI infrastructure layer, and a virtual transmission resource identity of a VM.

The VM identity may include a VM identifier ID or a VM name, the HOST identity may include a HOST ID or a HOST name, and the virtual transmission resource identity of a VM may include a virtual transmission resource ID or a virtual transmission resource name.

Specifically, the virtual transmission resource identity, for example, a VPORT ID or a VPORT name, for another example, a vNIC ID or a vNIC name, of a VM is used to uniquely identify a VM.

The first object identity may be used to uniquely identify a first object, and the first object identity may include at least one of the following: a VNF identity, a VM identity, and a virtual transmission resource identity of a VM.

The preset association between object identities may be used to indicate an association between different object identities.

Optionally, the first alarm message further includes first alarm information set, and the first alarm information set includes at least one of the following: NFVI alarm information, VM alarm information, and VNFM alarm information.

For related descriptions of all the foregoing alarm information, refer to the embodiment shown in FIG. 7 or FIG. 8, and details are not described again.

Optionally, the processor 1502 is specifically configured to:

obtain, according to a preset correspondence between the third object identity and a VNF identity and the third object identity in the VM alarm information, a VNF identity corresponding to the third object identity, and use the obtained VNF identity as the first object identity to generate the first alarm message; or perform correlation analysis on the VM alarm information to generate the first alarm message.

For specific details, refer to the two implementation manners of step 803 in the embodiment shown in a figure, and details are not described again.

By using the VNFM provided in this embodiment of the present invention, a first alarm message is reported to an EMS, so that the EMS performs analysis of a correlation with VNF alarm information according to the first alarm message, and further determines alarm information at different layers that has a correlation relationship, which implements a cross-layer association between alarm information, avoids complexity for manually analyzing an alarm, and reduces time for analyzing an alarm, thereby reducing costs of operation and maintenance of a network.

Figure 16:
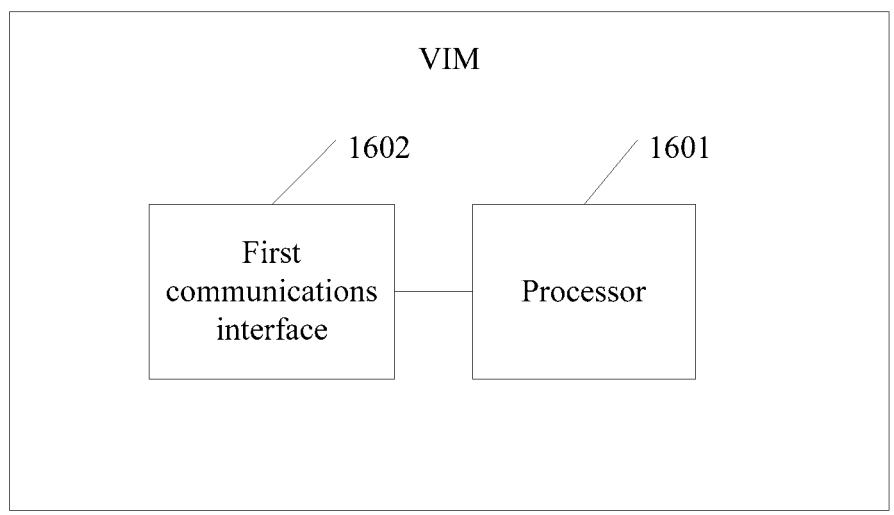
FIG. 16 is a schematic structural diagram of still another alarm information processing apparatus according to an embodiment of the present invention.

Referring to FIG. 16, FIG. 16 shows an alarm information processing apparatus according to an embodiment of the present invention. The apparatus is a VIM. The apparatus may be configured to execute operating steps of the VIM in the embodiment shown in FIG. 9 or FIG. 10 and may specifically include a processor 1601 and a first communications interface 1602.

The processor 1601 is configured to perform correlation analysis on at least two pieces of alarm information to generate virtual machine VM alarm information.

The first communications interface 1602 is configured to report the VM alarm information generated by the processor 1601 to a virtualized network function manager VNFM, so that the VNFM reports, according to the VM alarm information, a first alarm message to an element management system EMS, where the EMS performs correlation analysis on the first alarm message and second alarm message that is reported by a VNF.

The at least two pieces of alarm information may include:
at least one piece of network functions virtualization infrastructure NFVI alarm information and at least one piece of VM alarm information; or
at least two pieces of NFVI alarm information; or
at least two pieces of VM alarm information.

Optionally, the foregoing apparatus further includes:
a second communications interface 1603, configured to receive NFVI alarm information reported by an NFVI, where the NFVI alarm information includes an NFVI identity; and
the processor 1601, configured to perform correlation analysis on the NFVI alarm information received by the second communications interface 1603, so as to generate the VM alarm information; where
the NFVI identity includes at least one of a VM identity, a HOST identity, and a virtual transmission resource identity of a virtual machine, the VM identity includes a VM identifier ID or a VM name, the HOST identity includes a HOST ID or a HOST name, and the virtual transmission resource identity of a VM includes a virtual transmission resource ID or a virtual transmission resource name.

By using the VIM provided in this embodiment of the present invention, correlation analysis is performed on at least two pieces of alarm information, which reduces complexity for manually analyzing an alarm and reduces time for analyzing an alarm. In addition, correlation analysis is performed by the VIM on alarm information, which greatly reduces load on a VNFM.

This embodiment of the present invention and the method embodiment 1 are based on a same conception, and technical effects brought by this embodiment of the present invention and the method embodiment are also the same. For specific principles, refer to the description of the method embodiment, and details are not described herein again.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may include: a magnetic disk, an optical disc, a read-only memory (ROM), or a random access memory (RAM).

What is disclosed above is merely exemplary embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. An alarm information processing method, comprising:
receiving, by an element management system (EMS), a first alarm message reported by a virtualized network function manager (VNFM), wherein the first alarm message comprises a first alarm association information and a first alarm information set, the first alarm association information comprising a first object identity comprising a virtualized network function (VNF) identity, wherein the first alarm information set is a fault tree;
receiving, by the EMS, a second alarm message reported by a VNF, the second alarm message comprising a second alarm association information and a second alarm information set, the second alarm association information comprising a second object identity, wherein the second object identity comprises a VNF identity, wherein the second alarm information set is a fault tree;
performing, by the EMS, correlation analysis on the first alarm message and the second alarm message according to the first alarm association information and the second alarm association information, and further according to a preset time correlation rule and a preset space correlation rule for grouping the alarm information having a correlation relationship; and
dispatching, by the EMS, a work order for the alarm information having the correlation relationship.

2. The method according to claim 1, wherein the VNF identity comprises a VNF identifier (ID) or a VNF name.

3. The method according to claim 1, wherein the first alarm information set comprises at least one of the following: network functions virtualization infrastructure (NFVI) alarm information, virtual machine (VM) alarm information, and VNFM alarm information.

4. The method according to claim 1, wherein the second alarm information set comprises at least one piece of VNF alarm information.

5. The method according to claim 1, further comprising:
receiving, by the virtualized network function manager (VNFM), the VM alarm information reported by a virtualized infrastructure manager (VIM), wherein the VM alarm information comprises a third object identity;

generating, by the VNFM, the first alarm message according to the VM alarm information, wherein the first alarm association information further comprises at least one of the following: a first object identity comprising a virtualized network function (VNF) identity, and a preset association between object identities; and sending, by the VNFM, the first alarm message to the EMS.

6. The method according to claim 5, wherein the third object identity comprises at least one of the following: a VM identity, a HOST identity at an NFVI infrastructure layer, and a virtual transmission resource identity of a VM, wherein the VM identity comprises a VM identifier (ID) or a VM name, the HOST identity comprises a HOST ID or a HOST name, and the virtual transmission resource identity of a VM comprises a virtual transmission resource ID or a virtual transmission resource name.

7. The method according to claim 5, wherein the preset association between object identities is used to indicate an association between different object identities.

8. The method according to claim 5, wherein the first alarm message further comprises a first alarm information set, and the first alarm information set comprises at least one of the following: NFVI alarm information, VM alarm information, and VNFM alarm information.

9. The method according to claim 5, wherein the generating the first alarm message according to the VM alarm information comprises:

obtaining, according to a preset correspondence between the third object identity and a VNF identity and the third object identity in the VM alarm information, a VNF identity associated with the third object identity, and using the obtained VNF identity as the first object identity to generate the first alarm message; or performing correlation analysis on the VM alarm information to generate the first alarm message.

10. An alarm information processing method, comprising:
performing, by a virtualized infrastructure manager (VIM), correlation analysis on at least two pieces of alarm information to generate virtual machine (VM) alarm information according to alarm information parameters; and reporting, by the VIM, the generated VM alarm information to a virtualized network function manager (VNFM), wherein the VM alarm information is used for the VNFM reporting a first alarm message to an element management system (EMS) for performing correlation analysis according to a preset time correlation rule and a preset space correlation rule for grouping the alarm information having a correlation relationship on the first alarm message and a second alarm message that is reported by a virtualized network function (VNF), and for dispatching a work order for the alarm information having the correlation relationship, wherein the first alarm message comprises a first object identity comprising a VNF identity, wherein the first alarm message comprises a first alarm association information and a first alarm information set, the first alarm association information and the second alarm message comprises a second alarm association information and a second alarm information set, the second alarm association information and the first alarm information set is a fault tree and the second alarm information set is a fault tree.

11. An alarm information processing apparatus, comprising wherein an element management system (EMS), the EMS comprising:

a first EMS communications interface, configured to receive a first alarm message reported by a virtualized network function manager (VNFM), wherein the first alarm message comprises a first alarm association information and a first alarm information set, the first alarm association information comprising a first object identity comprising a virtualized network function (VNF) identity, wherein the first alarm information set is a fault tree;

a second EMS communications interface, configured to receive a second alarm message reported by a VNF, the second alarm message comprising a second alarm association information and a second alarm information set, the second alarm association information comprising a second object identity, wherein the second object identity comprises a VNF identity, wherein the second alarm information set is a fault tree; and an EMS processor, configured to:
perform, according to the first alarm association information and the second alarm association information, and further according to a preset time correlation rule and a preset space correlation rule for grouping the alarm information having a correlation relationship, correlation analysis on the first alarm message received by the first EMS communications interface and the second alarm message received by the second EMS communications interface; and dispatch a work order for the alarm information having the correlation relationship.

12. The apparatus according to claim 11, wherein the VNF identity comprises a VNF identifier (ID) or a VNF name.

13. The apparatus according to claim 11, wherein the first alarm information set comprises at least one of the following: network functions virtualization infrastructure (NFVI) alarm information, VM alarm information, and VNFM alarm information.

14. The apparatus according to claim 11, wherein the second alarm information set comprises at least one piece of VNF alarm information.

15. The apparatus according to claim 11, further comprising a virtualized network function manager (VNFM), the VNFM comprising:

a first VNFM communications interface, configured to receive virtual machine (VM) alarm information reported by a virtualized infrastructure manager (VIM), wherein the VM alarm information comprises a third object identity;

a VNFM processor, configured to generate the first alarm message according to the VM alarm information received by the first VNFM communications interface, wherein the first alarm association information further comprises a preset association between object identities; and a second VNFM communications interface, configured to send the first alarm message generated by the processor to the EMS.

16. The apparatus according to claim 15, wherein the third object identity comprises at least one of the following: a VM identity, a HOST identity at an NFVI infrastructure layer, and a virtual transmission resource identity of a VM, wherein the VM identity comprises a VM identifier (ID) or a VM name, the HOST identity comprises a HOST ID or a HOST name, and the virtual transmission resource identity of a VM comprises a virtual transmission resource ID or a virtual transmission resource name.

17. The apparatus according to claim 15, wherein the preset association between object identities is used to indicate an association between different object identities.

18. The apparatus according to claim 15, wherein the first alarm message further comprises a first alarm information set, and the first alarm information set comprises at least one of the following: NFVI alarm information, VM alarm information, and VNFM alarm information.

19. The apparatus according to claim 15, wherein the VNFM_processor is further configured to:
   obtain, according to a preset correspondence between the third object identity and a VNF identity and the third object identity in the VM alarm information, a VNF identity associated with the third object identity, use the obtained VNF identity as the first object identity, and generate the first alarm message according to the first object identity; or
   perform correlation analysis on the VM alarm information to generate the first alarm message.

20. An alarm information processing apparatus, wherein the apparatus is a virtualized infrastructure manager (VIM), the apparatus comprising:

a processor, configured to perform correlation analysis on at least two pieces of alarm information to generate virtual machine (VM) alarm information according to alarm information parameters; and a first communications interface, configured to report the VM alarm information generated by the processor to a virtualized network function manager (VNFM), wherein the VM alarm information is used for the VNFM reporting a first alarm message to an element management system (EMS) for performing correlation analysis according to a preset time correlation rule and a preset space correlation rule for grouping the alarm information having a correlation relationship on the first alarm message and a second alarm message that is reported by a virtualized network function (VNF), and for dispatching a work order for the alarm information having the correlation relationship, wherein the first alarm message comprises a first object identity comprising a VNF identity, wherein the first alarm message comprises a first alarm association information and a first alarm information set, the first alarm association information and the second alarm message comprises a second alarm association information and a second alarm information set, the second alarm association information and the first alarm information set is a fault tree and the second alarm information set is a fault tree.

* * * * *